(12) United States Patent
Couturier et al.

(10) Patent No.: US 11,228,619 B2
(45) Date of Patent: Jan. 18, 2022

(54) SECURITY THREAT MANAGEMENT FRAMEWORK

(71) Applicant: International Business Machines Corporation, Armonk, NY (US)

(72) Inventors: Russell Couturier, Worcester, MA (US); Jason Flood, Artane (IE); Aidan Butler, Brackenstown (IE); Wayne F Tackabury, West Tisbury, MA (US); Patrick Hourigan, Fair Hill (IE)

(73) Assignee: International Busuness Machines Corporation, Armonk, NY (US)

( * ) Notice: Subject to any disclaimer, the term of this patent is extended or adjusted under 35 U.S.C. 154(b) by 140 days.

(21) Appl. No.: 16/855,103

(22) Filed: Apr. 22, 2020

(65) Prior Publication Data

US 2021/0336991 A1    Oct. 28, 2021

(51) Int. Cl.
*H04L 29/06* (2006.01)
(52) U.S. Cl.
CPC .................. *H04L 63/20* (2013.01)
(58) Field of Classification Search
None
See application file for complete search history.

(56) References Cited

U.S. PATENT DOCUMENTS

2002/0066034 A1* 5/2002 Schlossberg .......... G06F 21/552
726/23
2014/0215624 A1* 7/2014 Suzio .................... H04L 63/145
726/23
2018/0041523 A1* 2/2018 Lim .................... H04L 63/1408
2018/0255084 A1 9/2018 Kotinas

OTHER PUBLICATIONS

Hyland et al. "The Emergence of Virtual Reality and Augmented Reality in the Security Operations Center", Jul. 3, 2017, Security Intelligence, found at securityintelligence.com/the-emergence-of-virtual-reality-and-augmented-reality-in-the-security-operations-center/.
Zahariev, Alexander: Graphical User Interface for Intrusion Detection in Telecommunications Networks Master's Thesis Aalto University, Mar. 28, 2011.
AlienVault® Open Threat Exchange® The OTX Home Page Pulse Activity Display, found at https://cybersecurity.att.com/documentation/otx/otx-home-page-pulse-activity-display.htm on Apr. 21, 2020.
QRadar Pulse dashboard components and workspaces found at https://www.ibm.com/support/knowledgecenter/en/SSKMKU/com.ibm.Pulseapp.doc/t_Qapps_PulseDashboard_import_export.html on Apr. 21, 2020.

* cited by examiner

*Primary Examiner* — Cai Y Chen
(74) *Attorney, Agent, or Firm* — Jeffrey S. LaBaw

(57) ABSTRACT

A method, apparatus and computer program product for managing security threats to a distributed network. A set of events are aggregated from a plurality of event sources in the network for each of a set of security threats to the network. A magnitude of a characteristic of each of the set of security threats is determined. Each of the set of security threats is represented as a three dimensional graphical object in a three dimensional (3D) representation of the network according to the respective magnitude of the characteristic. A security action is taken based on the determined magnitude of one of the set of security threats.

20 Claims, 14 Drawing Sheets

SECURITY THREAT MANAGEMENT FRAMEWORK

BACKGROUND OF THE INVENTION

This disclosure relates generally to security incidents and graphical user interfaces for portraying the incidents. More particularly, it relates to a system, method and computer product for presenting a graphical user interface for finding, summarizing, depicting and prioritizing security intrusion events and ways to use that graphical depiction for responsive actions.

Computer networks continue to become larger and more complex; protecting them against malicious activity is an ever more complicated task. This means that the "threat surface" or "attack surface", the total number of the vulnerabilities in an enterprise, is also increasing. As this occurs, Security Operation Center (SOC) analysts can quickly become overwhelmed by the amount of information presented in multiple user interfaces, each from a different vendor, each vendor product with its own specialization and event source. Some of the information is irrelevant, redundant or of low priority. Given the flood of information, the amount of time wasted to determine an event's significance or irrelevance, in deference to security threat information of higher urgency cannot be allowed.

Throughout the network security industry, there is an emphasis in combating "cyber-attacks" by improving cyber defense strategies. Nonetheless, however improved these strategies become, modern networks will remain vulnerable to cyber-attacks by malicious individuals and organizations simply because they are becoming more interconnected and complicated. Thus, the inventors have recognized that there is a need to reduce the amount of information presented to an SOC analyst, thus reducing an attacker's ability to overwhelm an enterprise's resources through the dissemination of multitudinous events.

One challenge in developing an active cyber defense is the problem of accurately and intuitively describing security issues for analysis. Without an effective user interface, the potential deployment of counter measures is impaired or delayed due to inaccurately summarizing a security issue, e.g., its nature and severity.

Further improvements in graphical interfaces which present security issues are needed.

BRIEF SUMMARY

According to this disclosure, a method, apparatus and computer program product for managing security threats to a distributed network. A set of events are aggregated from a plurality of event sources in the network for each of a set of security threats to the network. A magnitude of a characteristic of each of the set of security threats is determined. Each of the set of security threats is represented as a three dimensional graphical object in a three dimensional (3D) representation of the network according to the respective magnitude of the characteristic. A security action is taken based on the determined magnitude of one of the set of security threats.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
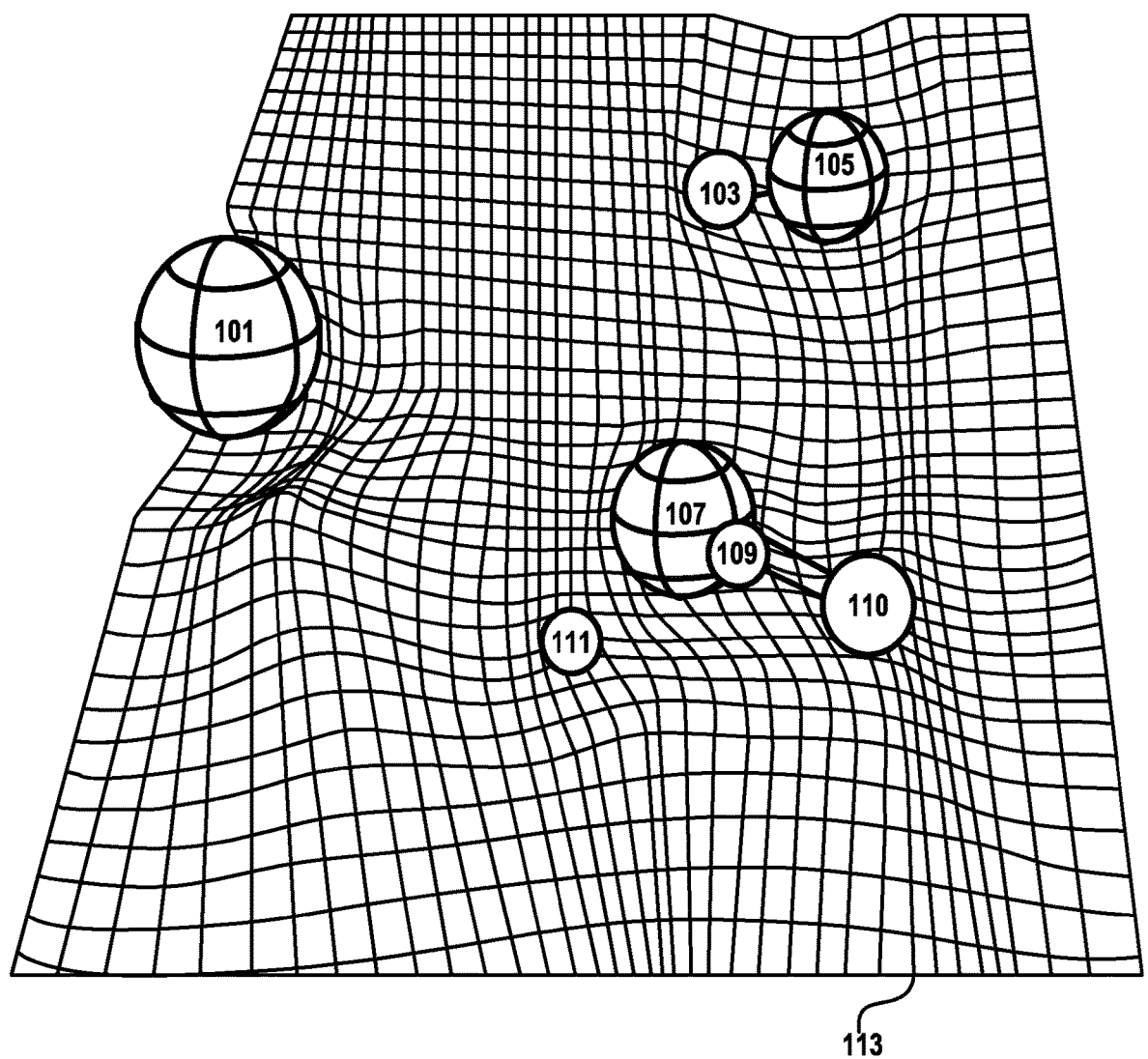
FIG. 1 depicts a perspective view of an exemplary interface for an embodiment of the present invention of a plurality of threat wells are shown against a network background.

At a high level, the invention describes a method, system and computer program product which combines input from a plurality of different event sources to provide a user an intuitive graphical user interface for displaying and summarizing threat severity in a distributed computing environment. In embodiments, the event sources are preferably a plurality of different types of event sources and mostly security threat sources. In preferred embodiments, a "threat well" and/or a "displayed mass" is used to portray the severity of the network threat in a "three-dimensional" (3D) user interface. In one threat well embodiment, a network is represented as a neutral X-Y graph and the "severity" of a particular network threat is portrayed as a proportional displacement (the threat well) to the planar X-Y graph of the network in a 3D manner. In alternative embodiments, the severity or nature of a particular network threat is portrayed as a "displayed mass", e.g. a circular or oval mass, over the planar X-Y graph of the network in a 3D manner. In yet other embodiments, a top view of the X-Y plane is displayed in graphical user interface with a displayed mass depicting a threat event. The display of the severity of the threat is presented in an intuitive manner to the user, e.g., as a "gravitational impact" or "mass", by its size or color as compared to the network in general. In this way, aberrations or anomalies which need the administration users' attention are prominent in the user interface and the relative importance of a threat is displayed as compared to other network threats. The nature of the interface can change as the user "drills down" on a particular security issue to display additional information about the security threat represented by a particular interface element.

In preferred embodiments, the "threat well" (TW) represents incident severity according to its scale along a vertical axis, i.e. depth, and uses its a horizontal axis, i.e. width, to represent factors upon which the severity of the event source is measured, e.g., a number of assets affected by the security threat. In embodiments of the invention, a plurality of factors reported from different security monitoring applications are aggregated and then normalized to present a consistent representation. Although a default assignment of different factors is available in embodiments of the invention, user or organization assignment of different factors to specific threat well graphical features to present a customized user view is available. For example, how a degree of "threat severity" is portrayed in the interface is dependent on user, preferably user administrator, settings in embodiments of the invention. Yet further, multiple views of the interface are possible, e.g., multiple views of a set of network assets, in which the effect of different factors are used to determine the severity of respective threat wells in each of the views.

The invention provides a model for analysis of security threats in the context of a realistically scaled volume of them, one which is intuitive and provides relevant analytic abilities. The model is portable across and recognizable between network security products and frameworks.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Graphical User Interface

The embodiments of the inventive interface graphically represent current organizational threats and their evolution in time. One goal of the system supplying the information for the interface is to traverse and aggregate the different sets of assets, e.g. the different "silos" or "verticals" within the organization, that play roles in the organization's overall network profile. Embodiments of the threat well framework are different than a traditional risk engine as they add intrusion feedback parameters from a plurality of security risk sources and flexibility to present security threats in an interface according to multiple views of organization specific parameters. The framework presents security threats as their properties, e.g., severity, change in the organization's network and as the organization changes the criteria by which the security threats are evaluated and ranked by the security risk sources.

FIG. 1 depicts a perspective view of an exemplary interface for an embodiment of the present invention of a plurality of threat wells are shown against a network background. Embodiments of the invention use 3D visual depictions of aggregated security events as threat wells, i.e. as tapering rounded elongated columns, which interrupt a planar 3D surface. In other embodiments of the invention, a "displayed mass" is used to portray the severity (and/or other parameters) of the network threat in a "three-dimensional" (3D) user interface. One skilled in the art of user interfaces will appreciate that a "three dimensional" interface can be displayed on a two dimensional display using well known techniques. Embodiments of the invention can also be presented using advanced 3D display technologies including multiview 3D displays, volumetric 3D displays and digital hologram displays.

In FIG. 1, a set of displayed masses 101-111 are shown over a grid 113 representing the network. Instead of a grid, other planar or pseudo-planar graphical objects can be used to represent the network. The size, dimensions and color and other manner of presentation of the 3D objects in the interface are used to summarize the security threats facing the organization quickly for the analyst. The aggregation of the severity data enables an embodiment of the invention to form each of the 3D objects' characteristics, e.g., the characteristics of the displayed masses. In drawings which follow, the 3D objects are depicted as threat wells. In FIG. 1, the height and width of the respective displayed mass can represent different aggregated parameters, e.g., number of assets affected by security threat and number of "high value" events collected pertinent to the security threat. Also, the depth (degree of furthest deviation from the planar surface) of the network grid around the displayed mass may indicate another parameter such as the severity of respective security threats. Here, the grid 113 under large mass 101 shows a deeper deviation than the network under masses 103-111. The displayed masses can be clustered together to show a relationship between different security threats, e.g. similar types of threats, similar assets, same organization or same geographic location. Lines between respective displayed masses can also represent relationships between security threats. For example, proximate displayed masses 107, 109, 110, 111 could be a cluster of related security threats. In some embodiments, a cluster of displayed masses or threat wells can represent different aspects of the same security threat. In embodiments of the invention, only security threats having a characteristic, e.g., severity, which is greater than a threshold value.

As will be seen below, in connection with FIGS. 2-5, a deeper deviation in the network grid can form a threat well. Embodiments of the invention may use threat wells or displayed mass objects or a combination of both. In the following description, the displayed 3D object will most commonly be referred to as a "threat well", but the reader should remember that the other objects can be used as well in embodiments of the invention.

Embodiments of the invention assess severity based on an evaluation of the severity of the event(s) which make up the threat, the assets, their number and importance to the organization, event geographic aggregation, organizational boundaries, or some combination thereof. In embodiments of the invention, input from a plurality of different types of security applications are used to characterize the security threat.

Figure 2:
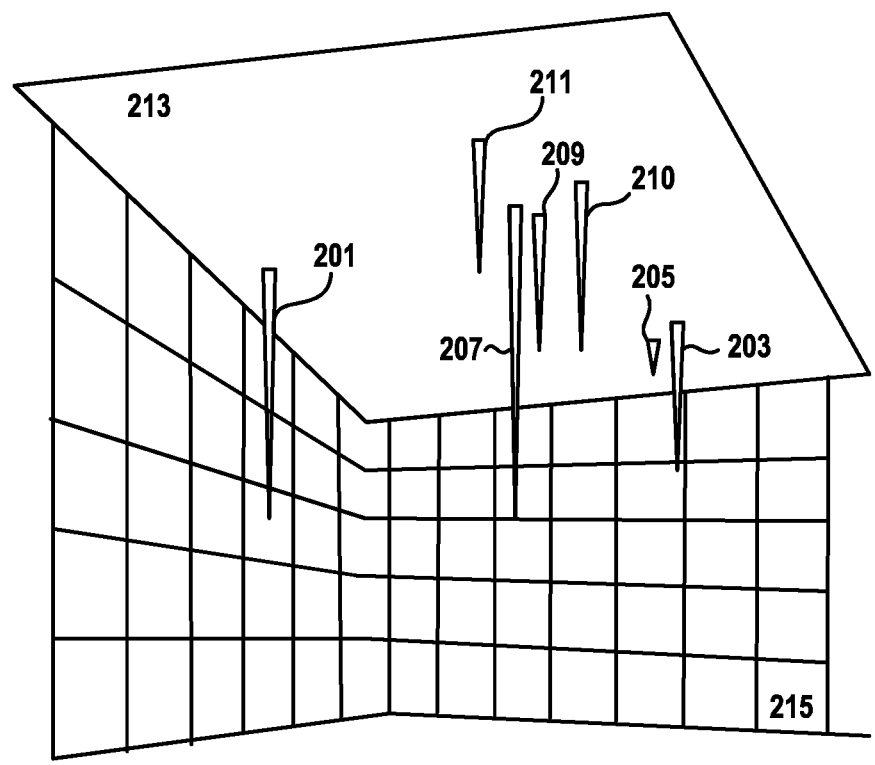
FIG. 2 shows a perspective view of the exemplary interface shown in FIG. 1 from a bottom view of the threat wells against the network background.

FIG. 2 shows a perspective view of the exemplary interface shown in FIG. 1 from a bottom view showing a set of threat wells against the network background. The user can "navigate" in 3D space in embodiments of the invention, looking at the threat wells from different angles or moving in 3D space to another set of threat wells portrayed in the "distance". In the drawing, a set of threat wells 201-211 corresponding to the displayed masses 101-111 in FIG. 1 is shown. This drawing represents the ability of the user to navigate below the grid 213 to see how much the grid has been displaced. In some embodiments of the invention, a second grid 215 is presented which helps a user understand the amount of the displacement of the respective threat wells. The amount of displacement of a threat well is representative of the severity of the security threat in some embodiments. Looking at the interface from below allows a better view of the depth of the threat wells than the top perspective shown in FIG. 1. In embodiments of the invention where both threat wells and displayed mass objects are used and represent different characteristics of a particular security threat, switching between a top view and a bottom view can be useful for the user to quickly understand the nature of the various security threats.

Figure 3:
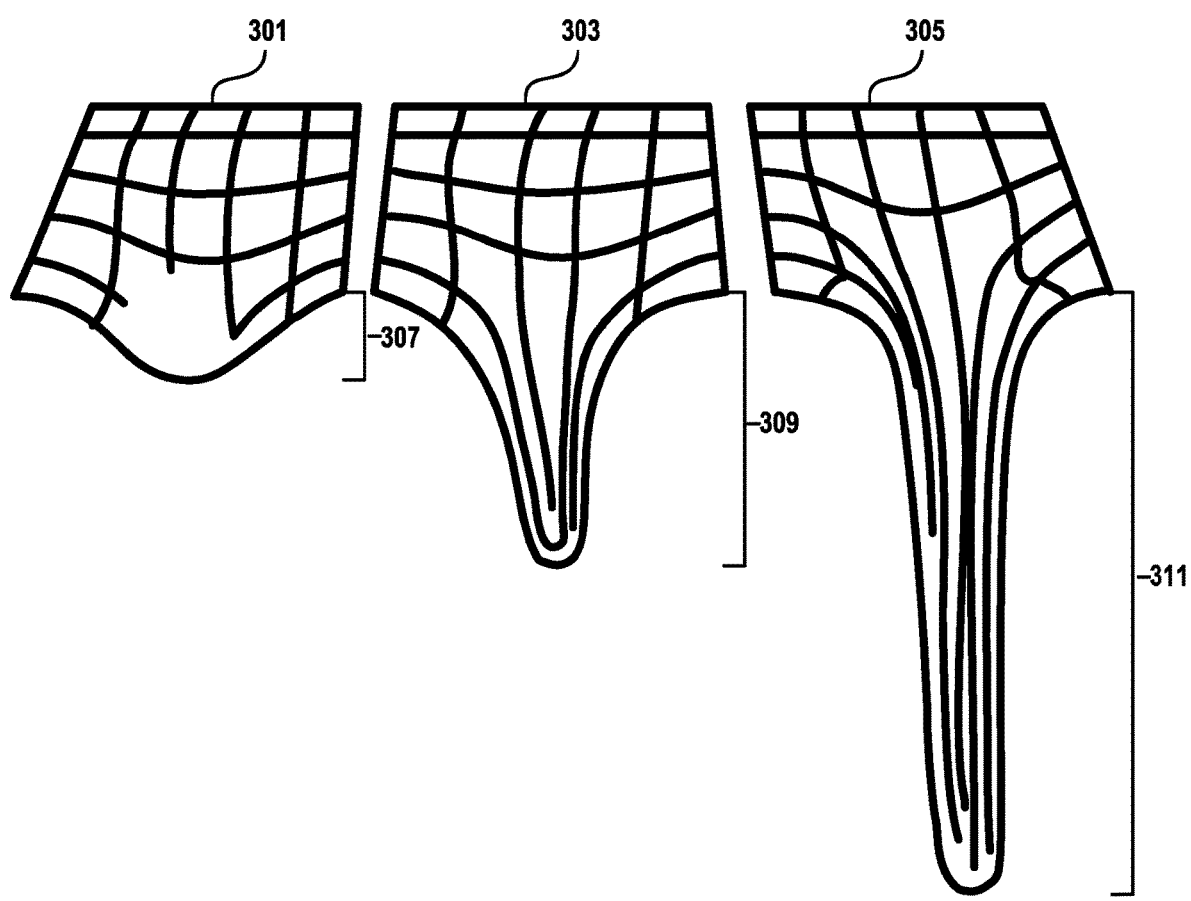
FIG. 3 depicts a cross-sectional view of three respective threat wells which can be used in an exemplary interface for an embodiment of the present invention.

FIG. 3 depicts a cross-sectional view of three respective threat wells which can be used in an exemplary interface for an embodiment of the present invention. The left-most threat well 301 represents a relatively small security threat; the middle threat well 303 represents a medium security threat and the right-most threat well 305 represents a high level security threat. In this drawing, the displacement distance represents the severity of the respective security threat.

Figure 4:
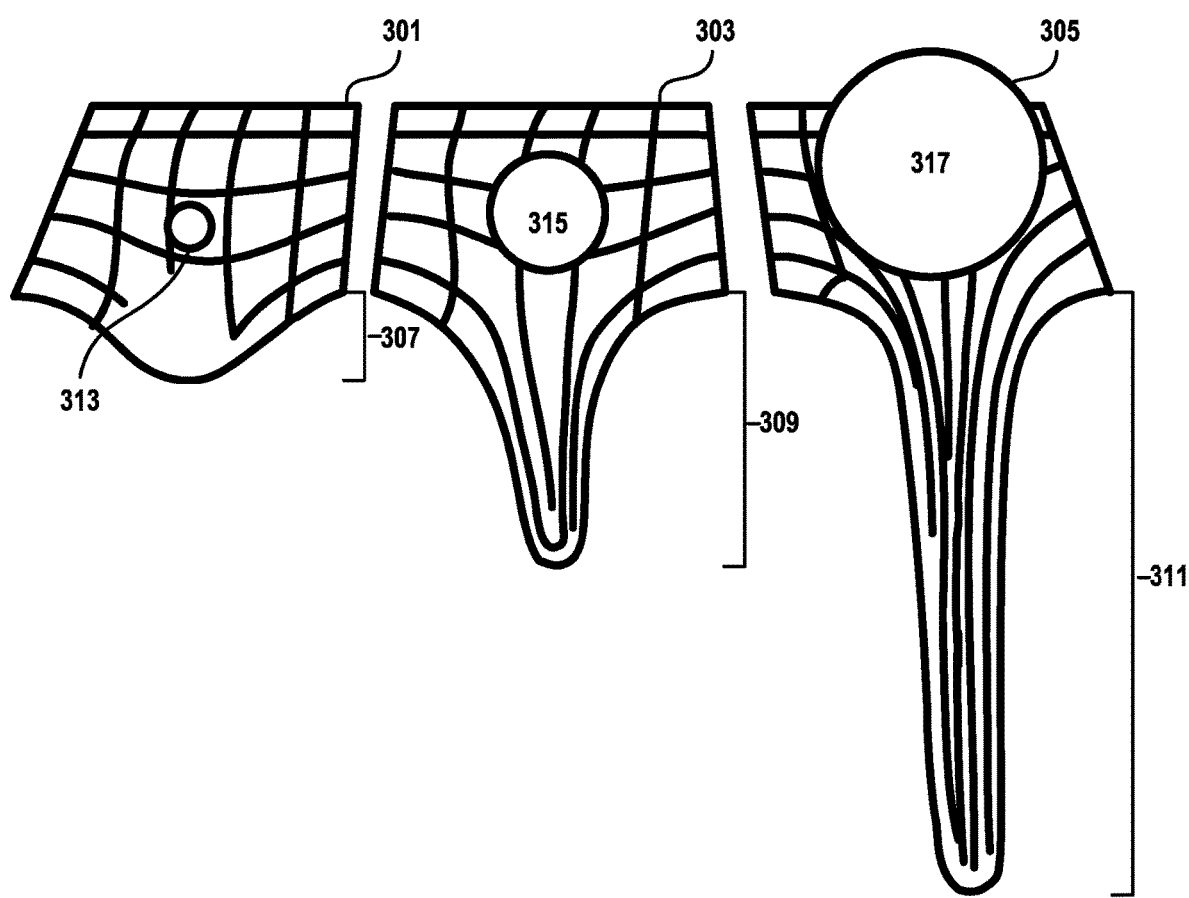
FIG. 4 depicts a cross-sectional view of three respective threat well/displayed mass objects which can be used in an exemplary interface for an embodiment of the present invention.

FIG. 4 depicts a cross-sectional view of three respective threat well/displayed mass pairs which can be used in an exemplary interface for another embodiment of the present invention. The left-most threat well/displayed mass pair 301/313 represents a relatively small security threat; the middle threat well/displayed mass pair 303/315 represents a medium security threat and the right-most threat well/displayed mass pair 305/317 represents a high level security threat. In this drawing, the displacement distance of the threat well represents a first characteristic of the respective security threat, e.g., severity and the size of the displayed mass represents a second characteristic, e.g., a number of assets affected by the security threat.

Embodiments of the invention provide dynamic updates to the set of security threats based upon new incoming event data. Thus, the size, dimensions and color of the displayed mass or threat well objects change in time. As part of the evolution of the event aggregations and display of the threat well interface in time, one capability of the interface is to apply a "time-to-live" (TTL) decay to the display of a respective security threat represented by a threat well. Such a decay mirrors one typical dynamic that the most recent security offenses tend to be the ones of the greatest priority. For embodiments of the invention, threat wells that are the most recently refreshed with new events and in particular new events with similar findings are the threat wells which will remain prominent in the interface and will be less subject to TTL decay. A threat well representing a security threat which has been present in the interface without new events will decay and become part of the interface feature representing the network. However, a threat well which has new events correlated to it will be enriched and continue to be present in the threat well interface. The threat wells in the interface largely represent "recent" events, but because of the "decay" process older events will continue to be presented until their characteristics are no longer (very) unusual as compared to the other network elements.

Referring back to FIGS. 3 and 4, as a specific threat well is first instantiated and then decays in time, it might first be represented as the right-most threat well or threat well/dynamic mass pair. As time progresses, the security threat is older and so not as severe, so the middle threat well representation would be more appropriate as a threat well representation in the interface. With yet more time, the security threat severity decays further and the left-most threat well or threat well/dynamic pair is more appropriate.

In preferred embodiments, the TTL decay is measured based upon aggregation constraints over multiple discrete events. Such aggregation constraints include, but are not limited to time, complexity, organizational importance and environmental variables such as network, security patch levels and asset value. In some embodiments, the overall decay is defined for a "class" of threat wells meaning that events in the same class decay at the same rate. A class of threat wells in some embodiments will share the same aggregation constraints. In some embodiments, each security threat representation can "refresh" to start a decay "freshness" to start the decay process again when new security event data is associated with the security threat after the initial creation of the threat well. In some embodiments, the class of threat wells can "refresh" to start a decay "freshness" to start the decay process again given new security threat data for any member of the class. Where new events are collected, the decay of the threat well can be stopped or reduced in speed. Where many new events are collected, the original threat well representation might grow in size.

Color can also be used to indicate the severity of an intrusion event. For example, the background network may be presented as a relatively planar rectilinear grid of lines in a first color, e.g., green or gray. An incident would be indicated both by the rectilinear lines dropping down into a threat well and color; the lines comprising the TW would change from the first color to a second color, e.g., yellow or red, in the TW region. Referring again to FIG. 3, a portion 307 of the left-most threat well 301 represents a relatively small security threat may be colored in a first color, e.g. yellow. A portion 309 of the middle threat well 303 represents a medium security threat may be colored in a second color, e.g., orange. The portion 311 of the right-most threat well 305 may be colored in a third color, e.g., red, as representing the most serious security threat. In yet other embodiments, the portion 311 may be multi-colored, changing colors as the displacement grows, i.e. a top section being the first color, a middle section being the second color and a bottom section being the third color. A color gradient can also be used.

Referring again to FIG. 4, the displayed masses 313, 315, 317 can be displayed in different colors to represent different properties; they do not have to be the same color that the threat wells 307, 309, 311 that they are displayed with and may represent different characteristics of the security threat in preferred embodiments.

Figure 5:
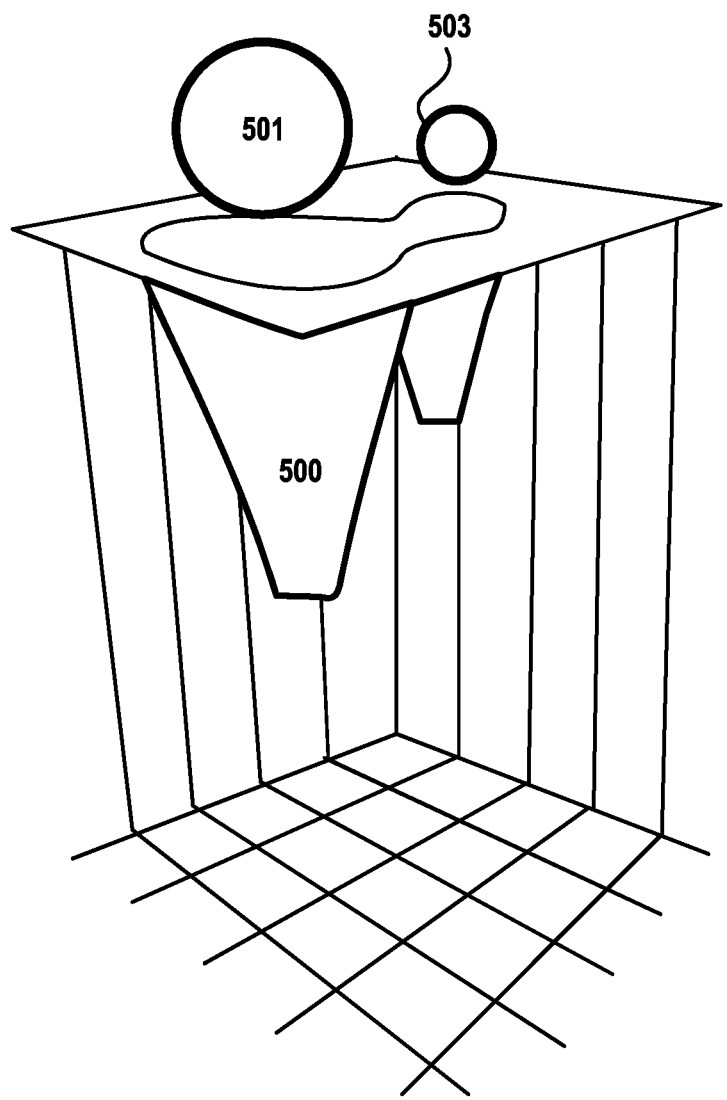
FIG. 5 illustrates a perspective view of a non-cylindrical threat well which can be used in an exemplary interface according to an embodiment of the invention.

FIG. 5 illustrates a perspective view of a non-cylindrical threat well which can be used in an exemplary interface according to an embodiment of the invention. In this drawing, a threat well 500 is accompanied by two displayed masses 501, 503. The threat well 500 is irregular in shape based on the combination of events from at least two event sources. In an embodiment of the invention, each of the displayed masses and the columns of the threat well represent event sources which are contributing to security threat information for the incident. In other embodiments, the displayed masses and/or columns are representative of different types of events which contribute to the threat well. The interface allows the user to select or deselect the different event sources or event types so the user can see the effect of including or removing any of the contributing event sources as the threat well changes shape or the displayed masses appear and disappear. In this view, as above, differences in coloration in the threat well or displayed masses can depict severity or other security threat parameters and can also change as the user selects or deselects the different event sources.

Figure 6:
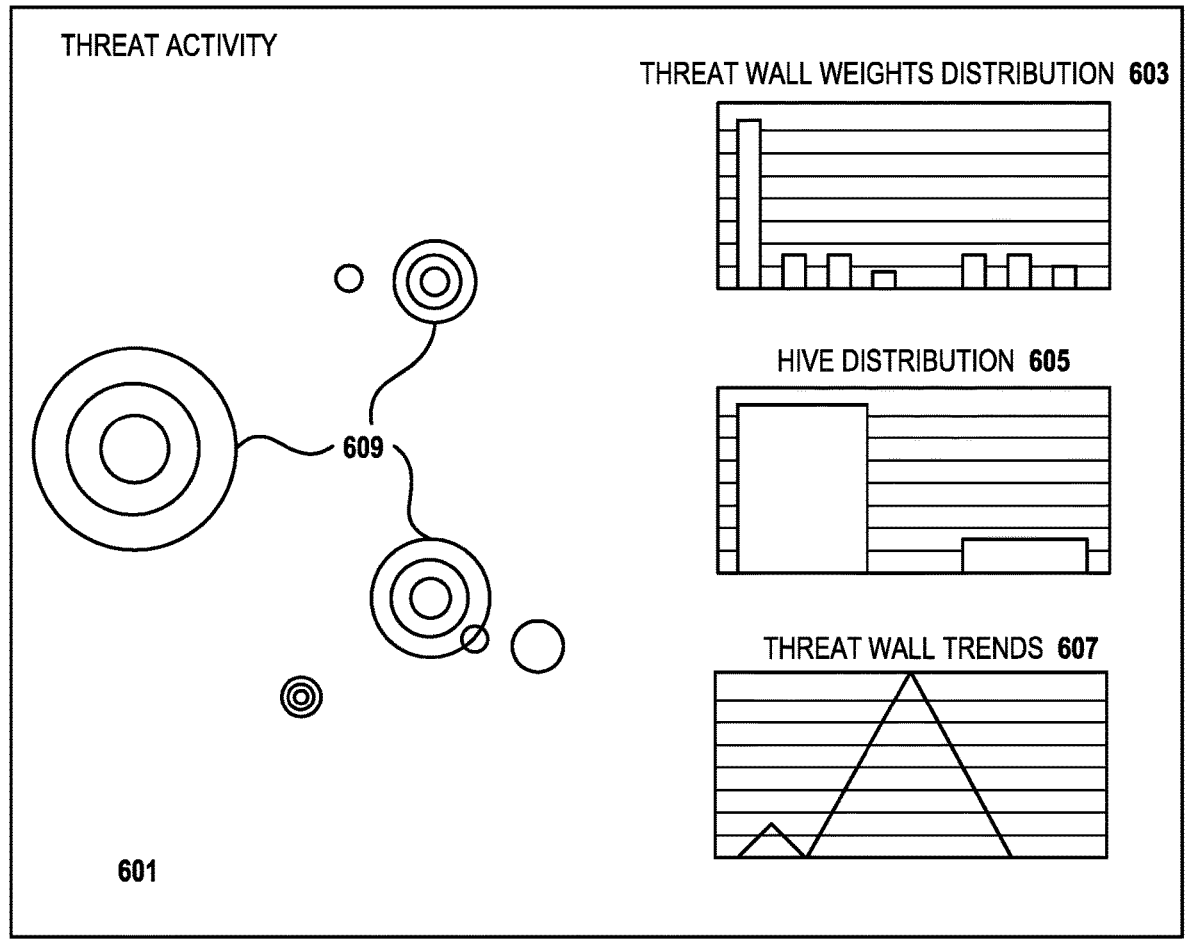
FIG. 6 is a top view of an exemplary interface according to an embodiment of the invention.

In embodiments of the invention, the user can navigate to a "top view" of the 3D interface. FIG. 6 is a top view of an exemplary interface 601 according to an embodiment of the invention. FIG. 6 also shows a set of charts which can summarize different aspects to a selected threat well. The charts which are presented include a threat well weights distribution 603, a high value event distribution 605 and a threat well trend chart 607. However, these charts are exemplary and a function of the selection of the user or organization. According to a user preference, once the user has moved to an "overhead" position, the interface can change to more of a two dimensional (2D) view in which the threat wells and/or displayed masses are displayed as a set of circles (or other shapes) 609. The color and size of the circles represent the severity of the security threat represented by a particular threat well. A threat well depicted as a set of concentric circles can represent a greater severity than a threat well depicted as a single circle. In embodiments of the invention, a user can cycle through the different aggregated characteristics which a threat well can represent; as the display changes in color and size of the circles (or other shapes) the user can understand the contribution of different parameters to the threat well. In embodiments, the location of the threat well is stationary in the different views so that the user can easily visually identify the respective threat wells as they change in appearance.

Figure 7:
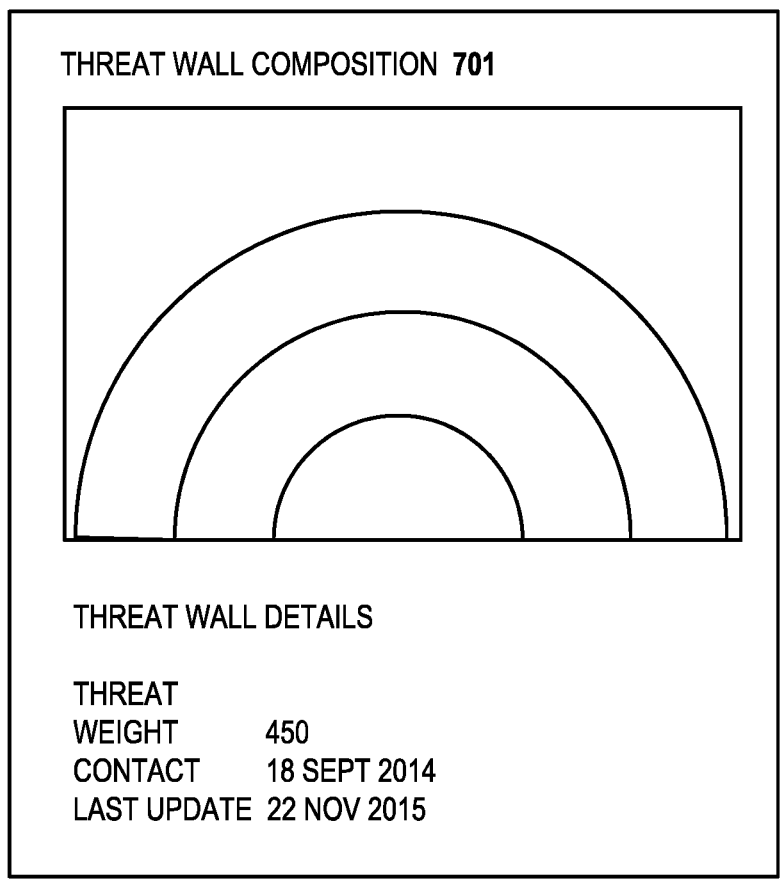
FIG. 7 is a top view of an exemplary interface according to an embodiment of the invention after a threat well has been selected for a drill down operation.

The top view interface also allows the user to "drill-down" on different aspects of the threat well data. FIG. 7 is a top view of an exemplary interface according to an embodiment of the invention after a threat well has been selected for a drill down operation. Here after the selection of a threat well, a panel 701 describing the threat well composition of a threat well is presented. The threat well composition data, for example, can include a threat well name, the size or severity of the security threat represented by the threat well, the source(s) of the threat well information, the credibility of sources and security threat, the start date and last date of update of the threat well and the type of security threat represented by the threat well. In addition, the composition data can include specific high value events which may be contributing to one or more of the characteristics which are displayed as a dimension of the threat well. Of course, one skilled in the art will recognize that other parameters can be included in a threat well composition panel. In embodiments of the invention, as the user drills down on the threat well, additional panels presenting threat well information will appear.

Using multiple threat wells (TWs) in the interface allows visual depictions of the severity (and other aspects of) security threat incidents relative to each other in a convenient view. A user easily sees the severe events and can perform second-order analysis on a specific event by selecting and showing additional attributes of the selected event.

After analysis, the user can take a remediation action on the security threat. The threat well interface can show the success of the remediation as the threat well decays in time. As mentioned in the description, in embodiments of the invention, severity is depicted as a "depth" of the associated threat well, so by comparing the relative depths of the TWs to each other as well as relative to perceived "ambient" levels (i.e., the X-Y plane) the user will quickly appreciate the threats facing the organization network. The interface can be customized for a given security operations center (SOC) and its business/prioritization policies.

In preferred embodiments, remediation can be initiated by a user input to the threat well interface. In some cases, this will result in a request to one of the applications serving as an event source to the interface. For example, an SIEM application is a typical event source in embodiments of the invention. The user input to the threat well interface can activate one of the functions of the STEM application to remediate the security threat. In other embodiments, the user can directly interact with the event source. Once the user has completed remediated actions, the event source can send an event back to the threat well application indicating that remediation actions have ben taken so that the threat well decay factor can be adjusted appropriately.

When security risk is analyzed across a network, there are typically many sources of risk information in the network. Embodiments of the invention present the information intuitively and meaningfully by summarizing the complexities of the many facets of a cyber security event as sensed by the different event sources. Because the different event sources represent security events differently, embodiments of the invention translate the measured risks in a way that maps across the risk sources. Embodiments of the invention translating the risks for a security threat specifically to one of a plurality of industrial sectors. A risk formula for an insurance business may not work for a banking business, for example.

In embodiments, a set of threat well components will typically include a plurality of premises-specific or tenant specific event collectors which collect events from a plurality of event sources. Once collected, the events are forwarded from each event source to a Threat Well event adapter. In embodiments, the event collector may process the event according to a native format (which may be prioritized to a native priority/severity) or may forward a raw event. Further, the threat well adapter can normalize, reprioritize or otherwise interpret the security event to a Threat Well severity, e.g., in a range from 0.0 to 10.0. That is, the adapter can translate a security source severity to the threat well severity or use the security source severity as part of the threat well severity calculation. In preferred embodiments, each event source has its own threat well event source adapter with its own set of rules for normalizing and interpreting events from the respective event source for inclusion in the severity level for a respective security threat object in the graphical user interface.

Figure 8:
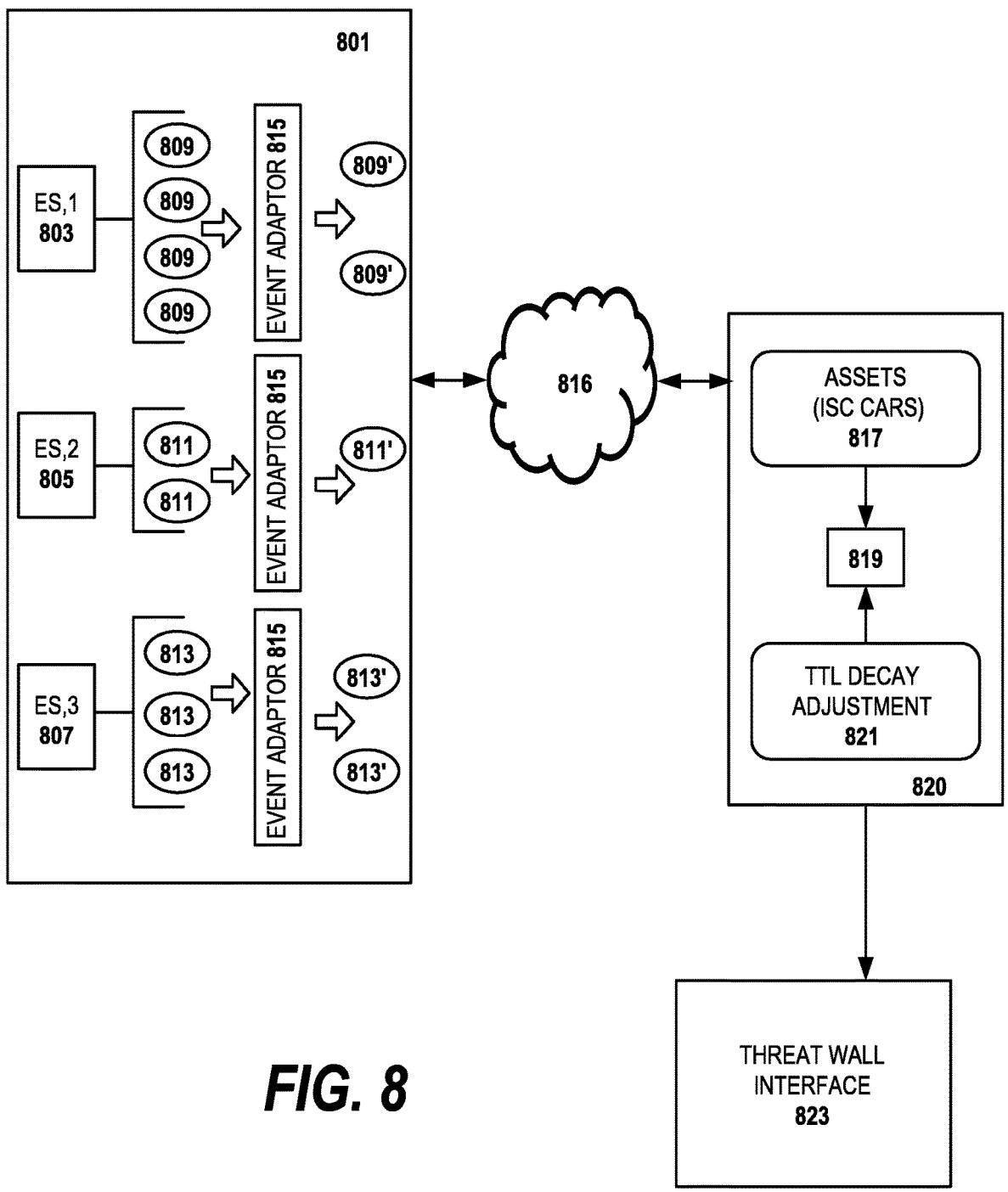
FIG. 8 shows an architectural diagram according to an embodiment of the invention in which the flow of events to the interface is shown.

FIG. 8 shows an architectural diagram according to an embodiment of the invention in which the flow of events to the interface is depicted. A customer network 801 is populated by a plurality of event sources 803, 805, 807. Event source 803 creates a first set of events 809. Event source 805 creates a second set of events 811. Event source 807 creates a third set of events 813. As will be discussed below, preferably the event sources 803, 805, 807 for the customer network 801 provide different types of event data using different formats concerning security threats to the network 801.

In preferred embodiments, the event sources 803, 805, 807 and the event source adapters 815 are distributed through the network 801, e.g., covering a specific organization. The event adapters 815 forward certain translated, normalized events 809', 811', 813' via an external network 816 such as the Internet to the threat well application 820 which is a cloud service. The threat well application 820 will define the threat wells using the events 809', 811', 813' of the monitored network from the event adapters 815. In embodiments, the event sources 803, 805, 807 are monitoring applications which monitor different security aspects of the network and typically send these events to centralized management applications. In embodiments, the event sources are the centralized security management applications wherein the event adapter or threat well application has subscribed to a set of events from the applications.

The threat well application 820 has at least three components in one embodiment: an asset manager 817, a manager object 819 and a TTL decay adjustment manager. As one skilled in the art will appreciate, these components may be implemented as separate applications. The asset manager 817 contains information about what assets are associated with different customers and groupings of assets within the respective customer organizations. In embodiments of the invention, the asset manager stores user defined groupings which provide a basis for the threat well interface 823. It may also contain information about what types of events are commonly associated with particular assets. In embodiments of the invention, the asset manager 817 is an application separate from threat well application such a Connected Asset and Risk (CAR) application which is used to identify asset data. IBM CloudPak for Security™ contains a CAR component. A lookup in such an asset database can be performed, and that lookup (or the enrichment agent doing it) can provide more data on the threat well indicating its index into separately modeled entities. For example, the lookup can determine entities found to be affected by the threat well and its high value events (HIvEs). In a simple case, the CAR function provides an index indicated by an IP address on one of interfaces which has that address. In some embodiments, the asset data includes IP addresses, hosts, users, databases, vulnerabilities, risk and the relationships between those parameters.

The manager object 819 takes as input groupings, for example, from the CAR application capability. In embodiments, the manager object 819 is responsible for identifying events and associating them with particular assets. The manager object 819 serves as the hub for associative operations, associating assets within organizational, geographical or other groupings based on the information from the asset manager, thereby creating the groupings which comprise each of the threat well objects. The threat well objects which can be used for associativity, TTL formulation and the threat well display. In preferred embodiments, the threat well objects are derived from the high value events captured from the API (which in turn could have undergone some other form of aggregation at the customer premises).

In embodiments, the manager object 819 also tracks the background TTL calculation for each threat well by using a TTL decay adjustment module 821. The manager object 819 may run the TTL decay process in the module 821 as a background process which works asynchronously to update each threat well aggregated instance. The threat well TTL decay calculation and new events are applied to the threat well calculations.

In other embodiments, the manager object 819 delegates primary event identification and system-managerial aspects of the asset associativity to the asset manager 817.

In embodiments of the invention, the threat well application 820 applies constraints to the respective input groupings for the threat well interface 823, i.e. supplying the depth, width and color values according to the aggregated parameters. Alternatively, the threat well application can supply the magnitudes of the parameters, e.g., the severity, number of assets assigned, importance of the assets, for each threat well and these parameters are passed to the threat well interface 823 for presentation according to the depth, width and color parameters. In embodiments of the invention, the threat well application 820 also supplies the parameters which are the sources of the threat wells that can be displayed in a drill-down menu. In other embodiments, these parameters are supplied to the threat well interface in an as needed basis, e.g. if the user selects a particular threat well for more information. The threat well interface process 823 presents the interface from the information provided by the manager object and manages the display to create, delete and modify the set of threat wells in the interface presented on the display.

In a respective threat well interface 823, possibly only a specific portion of the organization network such as an "on premises" portion of the network 801 is displayed as a set of threat wells. For example, an SOC organization may only be responsible for monitoring events of a particular division or application of the organization. The threat well service 820 can provide respective interfaces to a plurality of organizations. Although for ease in illustration, only a single customer network with a limited number of event sources is shown the reader should understand that multiple customer networks running different sets of vendor applications can communicate with a single threat well service. In one embodiment of the invention, the security events for a specific tenant in a multitenant environment are presented in a respective threat well interface. The tenant makes a request to the hosting organization to send events from that portion of the cloud environment assigned to the tenant or to a specific tenant organization. Data from different tenants or customers can be aggregated separately and not impact other tenant or customer threat wells. Each customer will receive its own threat well interface.

In embodiments of the invention, one or more of the threat well event source adapters have a threshold selection for what qualifies as a High Value Event (HiVE), that is, what events should be forwarded to the threat well application. In the drawing, only certain events are forwarded to the threat well application. HiVEs are aggregated into a threat well calculation, whereas those events which do not qualify, i.e. do not meet the threshold, are discarded from subsequent processing. High value events are events which are judged to have high importance or credibility in establishing security threat severity, or another measured characteristic, as compared to other low value events. The criteria for meeting HiVE status can be established by the customer organization, i.e. can be customized. In different embodiment, the filtering operation is respectively performed by the event adapters or the threat well application.

Embodiments of the adapters use the REST API to forward the high value events to the Threat Well cloud application.

At the threat well cloud application, the received high value events are assigned with other received events to one or more security threats to be represented by a threat well. In embodiments, the high value events are associated to given security threats according to their relationship with affected assets. However, the grouping of events is dependent on user defined parameters.

As is mentioned above, the security threats are subject to TTL monitoring and time series decay. In embodiments, the security threats are also associated with other assets that may be affected by malfunction of the assets to which the events are most closely linked. That is, the threat well can portray possible associative impacts of the HiVEs based on a number of affected assets. As new events are aggregated and stored, the interface is dynamically updated to portray a "live view" of the security threats together with the TTL decay of older events affecting the organization network.

In embodiments of the invention, the high value events are aggregated according to asset association grouping, geographic grouping, tenant grouping, software asset groupings, enterprise location grouping, and other organizational groupings. This aggregation can itself have a boosting or lowering of the security threats represented in the interface as an aggregation of the high value security events. The security threat severity is based upon threat well application settings and policies in embodiments of the invention. Embodiments of the invention include continuous threat well updates of the associative relationships considered in the respective threat wells on the severity and "depth" of the threat wells as portrayed in the interface. In other words, as the groupings of assets change, e.g., different resources are assigned to a different tenant, the resources aggregated to respective threat wells will change as well in a dynamic manner.

In preferred embodiments, each threat well has a "lifecycle", i.e. when threat wells are created, when and by how much they grow, when and by how much they decay and when they cease to be active. While each threat well may have its own lifecycle, e.g., what and its own criteria for creation, growth, decay and end, classes of threat wells can share these characteristics.

A typical threat well lifecycle is the following: when a HiVE is received, some properties of the HiVE are used to see if their values have already been associated with an active threat well. If no such active threat well can be found that can be correlated to the property values of the HiVE received, and the HiVE meets a threshold value, then a new threat well is created. In embodiments of the invention which use an event adapter to establish that an event is a high value event (HiVE), the HiVE may have already passed the necessary threshold. The initial dimensions of this threat well is calculated using the formula for calculating the threat well depth using some of the HiVE properties as parameters to the formula. Exemplary properties include the business value of the assets associated with the HiVE, the severity of the HiVE, the credibility of the HiVE and the credibility of the source of the HiVE.

A typical scenario for how threat wells grow is the following: If active threat wells are found that can be correlated to the properties of the HiVE, the dimensions of these threat wells will be updated based on formula for calculating the threat well depth and using the HiVE properties previously mentioned as parameters to the formula. Note multiple existing individual threat wells could get linked in this process as a class of threat wells. For example, a HiVE could have properties that get correlated to multiple existing active threat wells. The weight of each of these threat wells would be the aggregated weight of all these linked threat wells. In embodiments, a class of threat wells can be clustered proximately in the interface or merged into a single threat well.

One scenario of how threat wells decay is the following: This decay occurs by periodically calculating the threat well dimensions. Threat wells shrink based on elapsed time since the last time that any new HiVE was added to the threat well. This is achieved using a formula for calculating the dimensions of the threat well which also has a weight time decay parameter that has the effect of reducing the dimension of the threat well over time.

Threat wells cease to be active if the threat well dimensions falls below a threshold during the shrinking process. Once this happens, no new HiVEs can be correlated to this threat well. If new HiVEs do occur at this point, new threat well will be created.

In embodiments of the invention the thresholds for creation and end of threat wells can be set by the customer organization which is using the threat well interface. When the threat wells are active, a user can select a threat well to understand which HiVEs are correlated to the threat well, i.e. the HiVEs which gave rise to the threat well and its continued existence.

Event Feeds and High Value Event Selection

Figure 9:
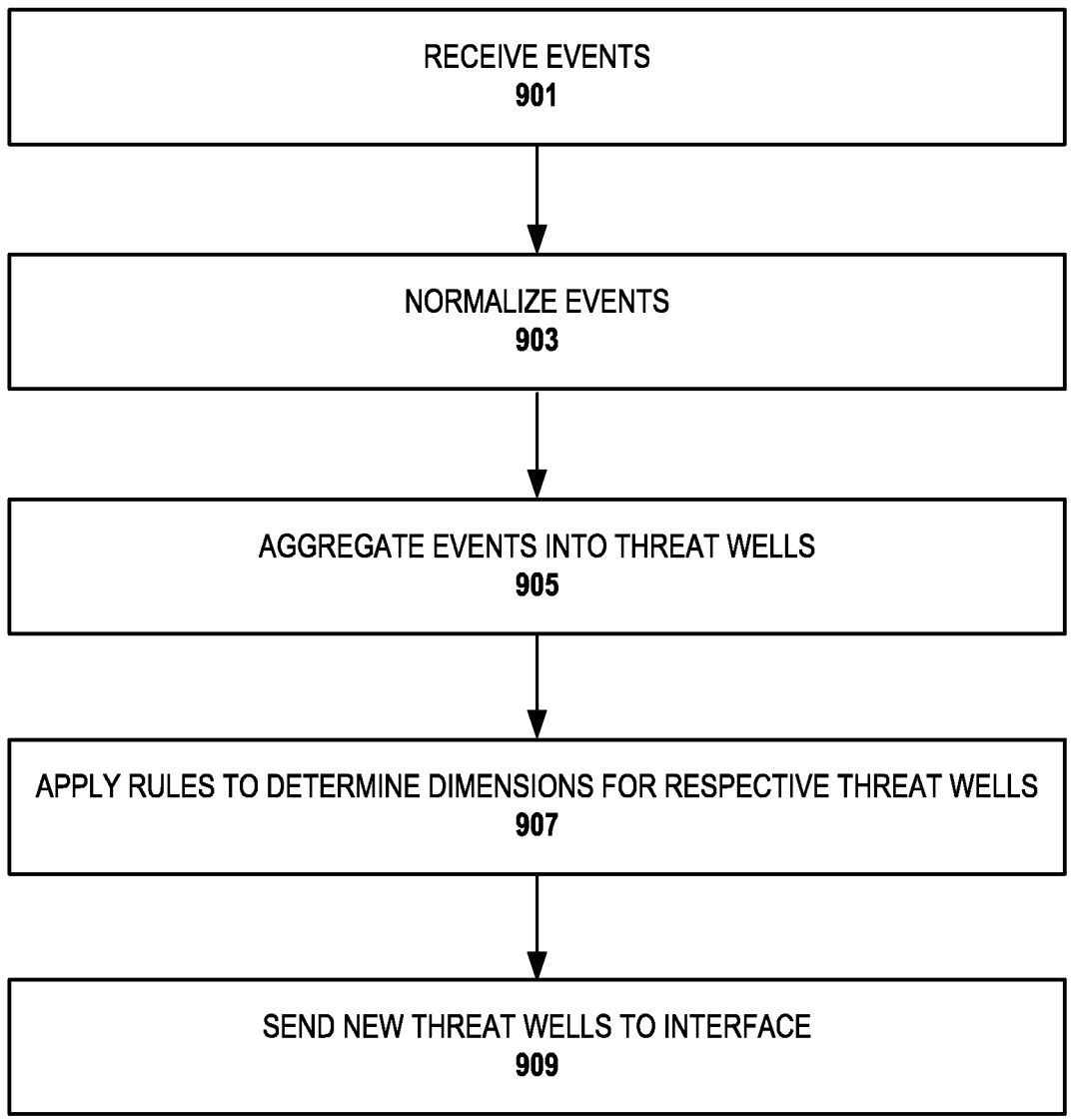
FIG. 9 is a flow diagram illustrating one embodiment of the invention for creating new threat wells in the interface.

As shown in FIG. 9, in preferred embodiments, the Threat Well pipeline begins with raw events, as received from event sources by event source adapters, step 901. Events can come from a Security Information and Event Management (SIEM) application, but the Threat Well system uses event sources from a variety of platforms and types of security applications. The SIEM application and other security applications either can forward the events to the event adapter or allow the event adapter to pull a set of subscribed events from the application, e.g., using correlation and native SIEM prioritization. The event sources can include a "nodal" event producing system—e.g., a security database event producing system like IBM Guardium™, or a security event manager which monitors events from specific sources like logs, intrusion detection, anti-virus, anti-malware or enforcement points such as firewalls. Event sources can include events from non-security types applications as well, e.g., a social media system API. Some of the events have their own source native notion(s) of severity and/or prioritization, while others have event payload information which is used by the system (the adapter or the threat well application) to create a severity/priority or other aggregated characteristic.

While an SIEM can be an important event source, the system can operate in the absence of SIEM adaptations of any kind, particularly in leaf customer premises deployments such as point of sale environments. Eliminating the SIEM application reduces the necessary premises footprint and compute power beneath that even required for other information security applications.

Other functions performed by embodiments of the threat well event source adapters as part of event adaptation is the ability to qualify severity (or prioritization) from the different event source contributions, step 903. Normalization or transformation of severity indications of the events which have native severity values can include a transformation of the native severity level to a normalized threat well security level. In embodiments, the event adapter or threat well application can use event information to construct a severity a basis for HiVE selection. Typically, normalization and transformation can be handled by the event adapters for one or more event sources and native severity indicators. For example, for events forwarded from an SIEM application such as IBM, the SIEM event source adapter considers event source severity native indicators. SIEM event source, often use established business logic and policy to determine prioritization. In embodiments, only the high value events are forwarded to the threat well application. In some embodiments, the normalization and transformation are shared tasks between the adapters and the threat well application.

In step 905, the event inputs are aggregated into respective threat wells for presentation in the three dimensional interface. Where multiple events from a particular event source are associated with the same threat well, the event source adapter can merge multiple events into a single event for HiVE determination. In SIEM events, each event can be associated with its own set of rules and/or severities; these can be merged into a single set of rules and severity to perform a HiVE severity determination. Where there is no event severity associated natively from the event source, the event source adapter can include its own set of business logic and policies to determine severity. In embodiments, for example, when an event providing application is aware of the threat well interface, a selective policy is used in the application to determine which events to forward to the threat well interface from the application. Again, in some embodiments, the aggregation function is a shared task between the adapters and the threat well application. Among the parameters which can be used to calculate the severity of a security threat include the event count associated with the threat, the credibility of the threat information, the relevance of the detected events to a threat directed at the aggregated assets, how additive the events are for the identified security threat and the importance of the assets to the organization.

Further information on the normalization process is presented below.

While embodiments of the invention use a variety of formulas and rules to aggregate event severities and other event information into a threat well in one embodiment the event source adapter calculates a treat well severity with a weighted formula, for example, one formula that can be used is:

$$\left(\frac{Sn(Ai*Sc)}{S\lambda}\right)^n_{S=1}$$

In this exemplary equation, SN represents the native HiVE value. (Alert or Offence severity), Ai represents the asset value. (Organizational value), Sc represents the confidence value of the intelligence source and SA, represents the half-life "TTL" of the HiVE element. As one skilled in the art will appreciate the threat severity formula be much more complex, taking in a variety of the aggregated factors associated with the threat well.

Embodiments of the invention use machine learning to modify the weights in the formula. The learning method can be unsupervised or supervised, i.e. using feedback from the SOC operators. In some embodiments of the invention, the event source passes all events to the event source adapter. In other embodiments, the event source or the event source adapter only pass important events to the system which presents the threat well interface. That is, events not meeting a profile or threshold of a HiVE, are not passed on, reducing the volume of events needing to be transformed into the threat well severity.

Once the events are aggregated into the respective threat wells, in step 907, rules are applied to determine the dimensions and colors of the threat well representations in the interface. In the simplest embodiment of the invention, only a single characteristic, e.g., severity, is calculated. However, in other embodiments, a plurality of characteristics, e.g., severity, credibility and number of assets affected can be displayed in the interface using the interface parameters. During the aggregation process, each of the characteristics of the respective threat well is calculated according to the formulas in effect for the organization or organization unit during the aggregation process.

The parameters for each of the characteristics represented by the threat wells are sent to the threat well interface, which is responsible for displaying the interface, step 909. In this step, the characteristics are matched to the interface dimension or color selected for that characteristic. The locations of the threat well in the network grid are selected. In embodiments where related threat wells are clustered, proximate locations are chosen for the related threat wells. In embodiments of the invention, the threat well information needed to present the drill down panels can be sent in this step. In other embodiments, additional information needed by the interface can be supplied by the threat well application in response to individual user queries or actions in the threat well interface.

In embodiments where a set of individual threat wells form clusters, the threat wells are those that exhibit similar behavior, i.e. have similar types of HiVEs that contributed to each threat well. The individual threat well members of the cluster could have different individual priorities, but they should have similar behavior, i.e. similar event types. The size of such clusters is the aggregated weight of the member threat wells' dimensions. The ability to prioritize can then be viewed at a cluster level by using the sizes of the clusters to drive the prioritization process. Different ways can be using to define a similarity index that can be used to determine if two threat wells are similar, e.g., Cosine Similarity, Jaccard Similarity, or another similarity formula. Each of these methods will provide a rating of how similar the set of event types are that contribute to a plurality of threat wells. If the similarity index is above a certain configurable threshold, then the threat wells are considered to be members of the same cluster.

Event Normalization and Threat Well Impact Assignment

"Normalization" of the event metadata is performed by the event source adapters in embodiments of the invention. In other embodiments, it is a shared task between the event source adapter and the threat well application which supports the interface. Where it is a shared task, the event source adapter transforms the events from the event source into a consistent format, while the threat well application uses the organization rules to associate different events into the respective threat wells and the aggregated event set is analyzed for each of the threat wells for the factors to be displayed in the interface. As is mentioned, in preferred embodiments, the threat well application is a cloud-based application.

As an example, the magnitude of a particular security factor is normalized from the customer premises or cloud based assets and systems assigned to the client or tenant. Once the events are aggregated into respective threat wells, each event is evaluated for its contribution to a particular security factor. Where the security factor is "associative", the threat well application adjusts the accumulated magnitude of the factor and displays the magnitude of the factor as one of the dimensions of the "threat well", e.g., the depth, width or color. Each of the dimension of a threat well is based on the threat well application policy preferences. In embodiments of the invention, the dimension associated with a particular factor is user definable. As new events arrive and are aggregated, the presentation of the threat well is dynamically adjusted. Also, as is mentioned above, the magnitude of the threat well will decay in time, particularly if new events are not received after threat well creation that are to be aggregated to a particular threat well.

In embodiments of the invention, an initial "magnitude" of the threat well severity is predominantly assigned by the event adapter(s) that determined and assessed the HiVEs before submission of the events to the threat well application. That is, where an organization has established a severity formula for events, the threat well application can base the initial severity from these type of events. This is one of the contributive factors to the severity formulas discussed above.

Embodiments of the invention use sets of default or user-defined formulas to normalize or otherwise process the outputs of a plurality of security sources. In embodiments of the invention, the formulas can be industry specific as well as "pluggable" so that the formulas can be changed dynamically for a specific organization or industry. The formulas are used to aggregate the network events, e.g., security threats or offenses, to prioritize their presentation in an interface for the cybersecurity team. In embodiments of the invention, the security threat data as aggregated and normalized is presented in a visual three dimensional fashion.

As a three dimensional artifact, the threat well has a plurality of ways of representing various security factors of the security threat. For example, the overall depth of the threat well as compared to the planar surface representing the network can be tied to the severity of a security threat represented by the threat well, whereas the width of the threat well could be, for example, the size of corresponding asset space.

In preferred embodiments, events are correlated based on linked entities, such as IP addresses, host names, malware types or users. In other embodiments, the list of entity types which are used for correlation include these factors and other factors or depend on other factors only.

Asset Relationship and Correlation

In preferred embodiments, a common service within the threat well application deals with the assignment of "assets" to be associated with each other, i.e. which assets should be grouped and associated with a particular threat well. This service is a global service which dynamic tracks the assets and resources within or assigned to an organization. In preferred embodiments, the common service is a CAR type service. Embodiments of the invention use any system providing information on risk and security that can be used as an input into the threat well system. Further, "aware" applications, those that are built for or are modified to provide input to the threat well application can take into account the asset mix which is monitored and provide association/aggregation information about which assets and resources should be grouped into a specific threat well. This information can be passed to the threat well application as metadata which accompanies the event source information.

Events are grouped by their associated entities in embodiments of the invention. The types and nature of entities include assets, both hardware and software, their owners, both actual and virtual and the event sources which provides event data to the threat well application. This list is merely exemplary and non-exhaustive. This is because the potential event data sources range across a myriad of platforms and technologies that are capable of producing events, log messages, or any other output that could be construed as an event or a message.

When events are created and added to the threat well system, embodiments convert the event by adding a matrix of their associated entities. Each entity matrix can be compared to existing matrices that have been already generated and stored. In the event of an entity match across event matrices, the matrices are combined into a larger matrix. These larger matrices form the basis for grouping and relationship management events into a threat well. The entity matrices are dynamic in embodiments, having the capacity to both grow and shrink in terms of which entities are assigned to a given threat well. For example, as entities on a given threat well entity matrix age out, or are otherwise no longer associated with the threat well, the threat well application removes this data from the entity matrix for the threat well.

Different organizations can influence the entity matrices by tuning their logging solutions, e.g., the event adapters tuned to a threshold for a high value event, to forward data at the right severity for them. This allows the threat well application to leverage a common creation engine but still produce organizationally independent results reflective of individual configurations and requirements.

The organization of assets for purposes of analytics may attach a plurality of metadata indicating a plurality of groups which the event data may be pertinent as part of the metadata. The metadata information about events or assets in the organization can not only contribute to the dimensions of the threat well, but also provide information that can be displayed in drill-down displays which are displayed to a user when a particular threat well is selected for greater information about the security threat represented by the threat well.

The grouping criteria that can be used to aggregate assets to a respective threat well include geographical, network and organizational criteria. For example, the assets which are located in certain building or city which are coupled to a given network and assigned to a particular organizational entity within the overall organization can be assigned to a particular threat well. Other combinations of location, network and organization would be assigned to other threat wells. Other criteria such as asset type or workload can be used to define a threat well, e.g., "all database servers in 172.16.1.0/20", can be provided by the CAR service or an alternative service. In such an embodiment, each threat well is composed of "joins" across multiple assets according to metadata criteria. The metadata and the grouping criteria for a respective threat well can be surfaced in the interface by selecting the threat well to cause a menu to be displayed with that information.

The various views for drill-down information across a set of reported aggregated threat wells can be adjusted for analytic and risk positioning features by user selection of information in the menus. A threat well is composed of events from a set of assets which share a set of relationships in preferred embodiments. These relationships are governed by the already described entities, e.g., customer, tenant, and the relationships that they have established in the event sources. The tenant or customer will use the interface to drill-down for additional focus on previously hard to identify bad-actor activity.

In one embodiment, the threat well application can be used to detect a distributed denial of service (DDoS) attack. As an example, a DDoS attack may occur when remote but essential L2 broadcast domains are flooded to impede network service fulfillment. When effectively mounted as an attack, DDoS can be elusive to a SIEM since the security events attacking the enterprise network are typically not aggregated to detect the particularly threatened grouping of assets but rather the individual assets are monitored individually. In a traditional SIEM application, there is no "auto adjustment" or automatic analytic associativity to catch a given pattern, and so each forwarded broadcast domain is at best reconciled with immediate actions which will have to be formulated and reapplied elsewhere across what could be a relatively huge distributed fabric. However, the threat well application can detect similar threat wells created for disparate locations within the organization, e.g., having a similar set of events, resulting in similar threat well characteristics. In some embodiments, auto-adjustment is used for entity relationship governance and oversight carried out without human intervention.

The threat well interface is designed for detection of security threats relatively early in the security threat life cycle. When "macro" threat wells, i.e. those containing large numbers of events or assets, are formed, the inputs used can include data analytics similar to that considered in a "Big Data" problem. In embodiments of the invention, this capability is greatly enhanced by storage and update of asset associations and macro aggregations using a graph database.

Threat well correlation vectors can be increased or attenuated in their linkage strength based upon organizational priorities and characteristics. The typical vector aggregation will work primarily according to identification of specific assets, but other grouping and associativity parameters can be used in determining linkage strength. For example, a typical "out of the box" correlation parameter of high linkage strength might be IP address. However, for an organization that works heavily in an environment with short-duration Dynamic Host Configuration Protocol (DHCP) server-provided IP addresses, those might be rather ephemeral as an indicator. In such an environment, for example, Dynamic DNS (as described in RFC 2136) may be employed to provide a predominant homing address identification, and hence that may be the primary linkage parameter to associate assets. The high value events reported via Dynamic DNS are then correlated into respective threat wells. In other embodiments, the primary notion of asset associativity may be the username to which a physical asset has been assigned. And finally, the primary associative vector could be an asset token which has been enhanced by an event adapter or by the threat well application by the underlying asset database, such as a CAR type database.

Offense Time-to-Live (TTL) Decay and Effect on Threat Well Presentation

An important and powerful feature of the threat well application treats each threat well as a dynamic object subject to an entropic decay of a rule-laden TTL application. The basic idea is a threat well magnitude will decay over a period of time without more new reports of events which are assigned to the threat well after initial threat well creation. An example of a current TTL decay heuristic in an embodiment is as follows:

$$\left(\frac{4((8)*1)}{1}\right)^n_{S=1} = \text{Day } 1 = 32$$

$$\left(\frac{4((8)*1)}{4}\right)^n_{S=1} = \text{Day } 2 = 8$$

$$\left(\frac{4((8)*1)}{16}\right)^n_{S=1} = \text{Day } 3 = 2$$

Over this measured duration, in practical terms, one of three things will have happened for a respective threat well:

(1) The security risk as depicted by the threat well graphical object in the interface had new occurrences as reported from customer premises site(s), hence the TTL will be reset and the threat well will maintain its prominence or even, if there are sufficient number of new events, may increase its magnitude in the interface as the threat well application adds these events to the perceived severity.

(2) The administrative user(s) may not have remediated the security threat represented by a threat well, but the threat well has not had subsequent events to renew it. So it decays out and becomes less prominent (possibly disappearing) in the interface. This behavior reflects the SOC reality that older events are less interesting than new ones.

(3) Remediation has been undertaken on the threat well condition. Even if the remediation is completely successful, in embodiments, there may be a remaining presence of the threat well in the graph and network report as representative of its prior, and now, vestigial presence. However, the effect of the remediation should be apparent from the TTL-driven decay of the well.

In embodiments of the invention, the interface can display different behavior or rates of decay between cases (2) and (3) by applying different TTL factors and coefficients. For example, the pre-remediation TTL decay for an unremediated threat would be a value of 0.33 and a TTL decay value for a remediated threat would be a value of 1.0. For the opposite effect, the TTL decay factor can be accelerated by representation as a derived value. The TTL decay derived value is established by evaluating the entities that are used to populate the variables in the formula. Over time, a pattern will be established within an SOC that can be used to determine the accuracy of the formula. Where the pattern was inaccurate, and tuning was needed, the tuning variable is the derivative value.

The visual effect in the interface in cases (2) and (3) is one where the threat wells will appear to be in a "healing" state as threat wells decay (wells become shallower or the masses become smaller). On the other hand, if new events are received for the particular threat well the threat well will heal slower, stay the same or even grow. Retaining remediated threat wells acts as a reminder of past, but recent security threats. It serves to remind the SOC operator of recent threats which may reoccur in another location of the network. In the inventors' opinion in a preferred embodiment rather than simply "aging out" threat wells, using rules for an entropic decay provides a better view of the recent and current security threat for the SOC operator. The TTL decay capability of embodiments of the invention is believed novel by the inventors. Ordering the TTL decay time according to the creation of the threat well or according to a class of threat wells is also believed novel. The "class" of threat wells can be based on creation time of the threat well(s) or based on the event(s), possibly shared events or events of the same type, which caused the creation of the threat wells. Alternately, the class of threat wells can be based on a relational query to come up with a time-arrival average or an average based upon selected "group by" criteria, i.e. all threat wells created by the same query are considered as part of the same class.

In embodiments of the invention, the TTL decay can have multiple formulae applied in series. As an example, a post-remediation TTL formula may apply a decay factor more aggressively than an unremediated TTL formula, since the latter represents a set of events which have been addressed. In the absence of new events, a threat well would be expected to decay to the background of the network. If threat well continues to have a residual presence in the interface, it can indicate that the remediation action was ineffective.

The threat well interface is used to remediate a security threat. Further, the interface is notified that an SOC operator has taken a remediation action so that the TTL decay factor or formula can be adjusted. In embodiments of the invention, the threat well user interface has a means of indicating that a threat well has been "assigned" to a particular SOC operator or to a particular remediation. The assignment can indicate that the amount of the temporal decay (TTL) of that threat well should be overridden or attenuated (since presumably a Security Operations Center operator has initiated remediation actions to the security threat represented by the threat well). In other cases, the threat well application receives an event or is otherwise linked to a security application, e.g., an outboard Security Orchestration, Automation, and Response (SOAR) platform, so that remediation actions on a threat well are known. The platform may be better suited to be able to manage more dynamic and involved workflow within the SOC to track incident remediation. Assigning a threat well to an SOC operator is analogous to assigning a "case" in other security applications.

The ability to identify other threat wells (past or present) that have a similarity index to a particular threat well allow the SOC operator to be able to choose to reuse a previous response actions carried out on threat wells that have a high similarity index. In embodiments, the similarity of different threat wells is calculated using the same approaches mentioned in relation to cluster membership, i.e. using algorithms such as Cosine Similarity or Jaccard Similarity on the set of HiVE event types that are associated with each threat well. If two threat wells are formed by similar occurring HiVEs, but on different assets, this would result in them having a high similarity index. The goal of this capability is to reuse the response associated with similar threat wells that have already been resolved to help resolve a threat well that is currently being investigated. If the similarity index is above a certain configurable threshold, the analyst or automated process could use the runbook of actions that described what actions were performed previously to remediate those similar threat wells to respond to the current threat well. These runbooks/response action list can contain a wide spectrum of actions, for example, sending a communication to a distribution list, performing actions such as reconfiguring a firewall, disabling user accounts, quarantining assets and so forth. These actions can be tracked by the threat well application or another security application of the customer network.

Figure 10:
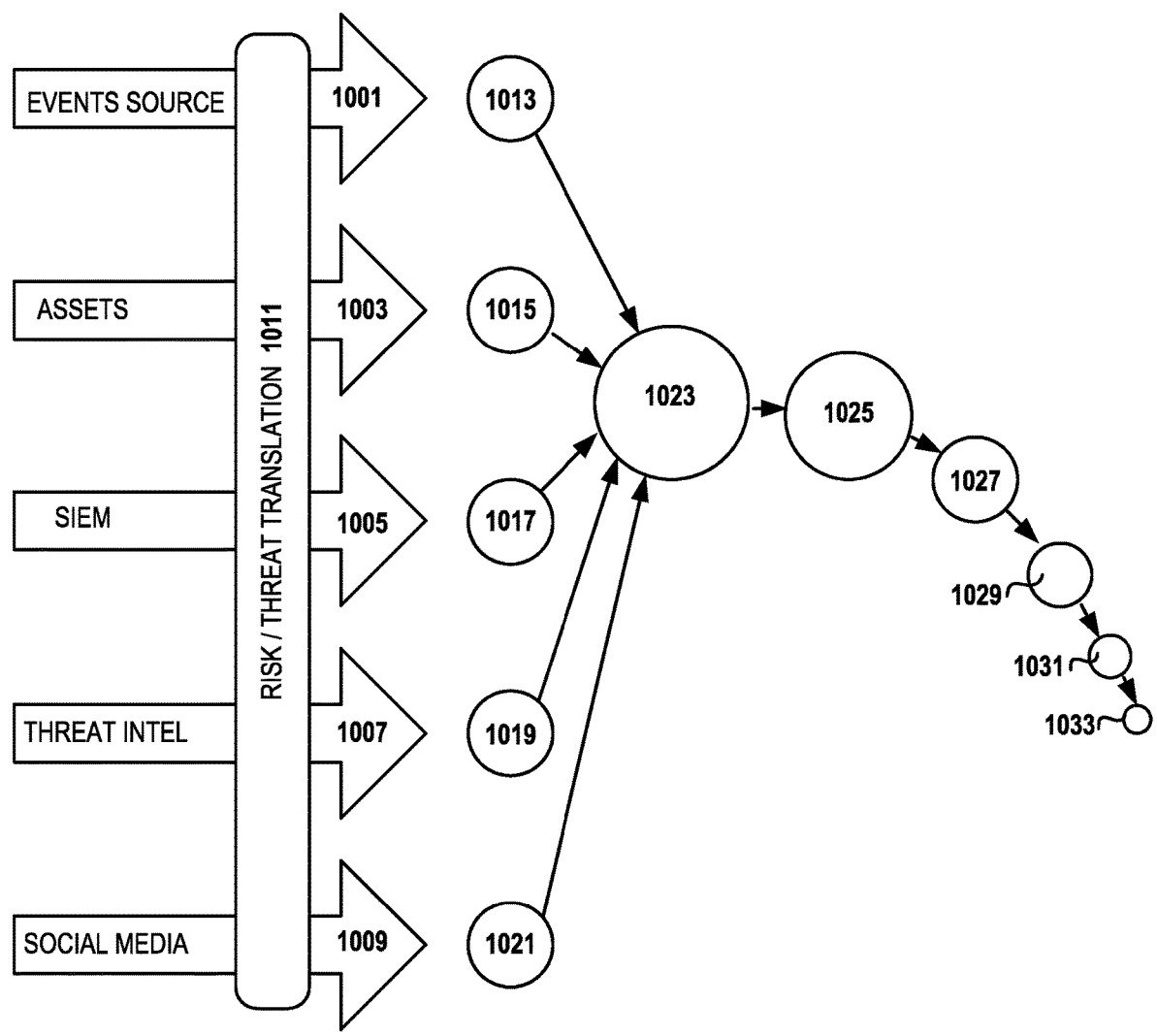
FIG. 10 illustrates the decay of a threat well in time according to an embodiment of the invention.

FIG. 10 is intended to represent the threat well decay process in one embodiment. As shown events from a set of event sources, e.g., event source 1001, asset information 1003 containing grouping information, SIEM 1005, Threat intel 1007, Social media 1009, are translated/normalized by one or more event adapters 1011 into a set of micro security threats 1013-1021. Because of the grouping information, the micro security threats are aggregated into a threat well 1023. The threat well is represented as a circle similar to the interface depicted in FIG. 6. Supposing that no more events are received for the threat well, e.g., the user has remediated the security threat, the threat well representation will shrink in size. The circles 1025 are intended to represent the shrinking sizes of the threat well representations in the interface.

Figure 11:
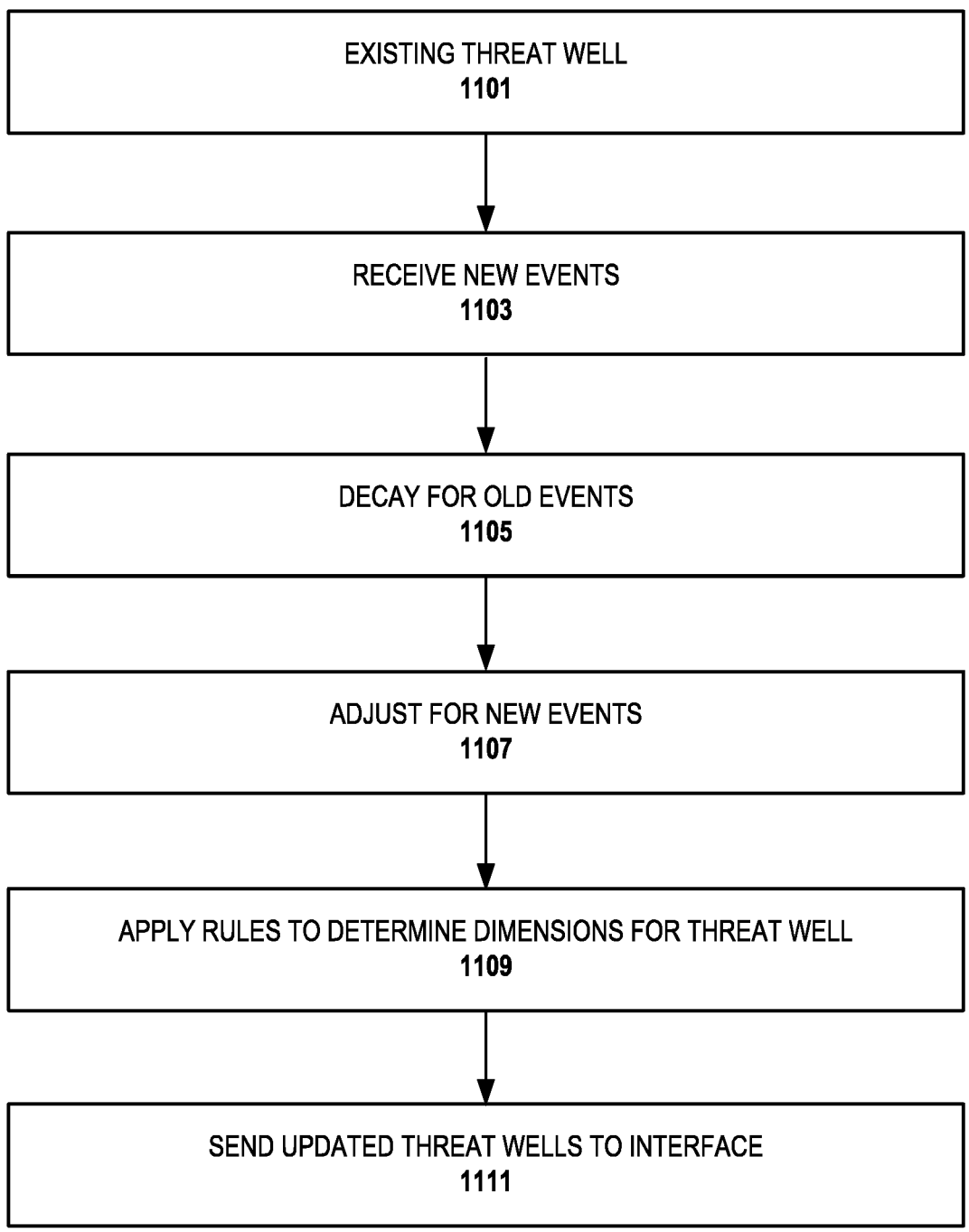
FIG. 11 is a flow diagram illustrating one embodiment of the invention for modifying an existing threat well in the interface according to a decay factor and new events assigned to the threat well.

FIG. 11 is a flow diagram illustrating one embodiment of the invention for modifying an existing threat well in the interface according to a decay factor and new events assigned to the threat well. Step 1101 represents the existence of an existing threat well, e.g., created from the process depicted in FIG. 9. In step 1103, new events are received which are associated with the threat well. The process determines how long the threat well has been in existence and whether the size of the threat well should decay because of the passage of time in step 1105. This decay due to the aging of the old events is compensated by the increase in size due to the new events in step 1107. Once the threat severity, and optionally other threat well characteristics, has been calculated, a set of rules is used to determined how the threat well is to be presented in the interface, i.e. the size and color of different features of the threat well. In step 1111, any updates are sent to the threat well interface.

Computer Architecture—

Figure 12:
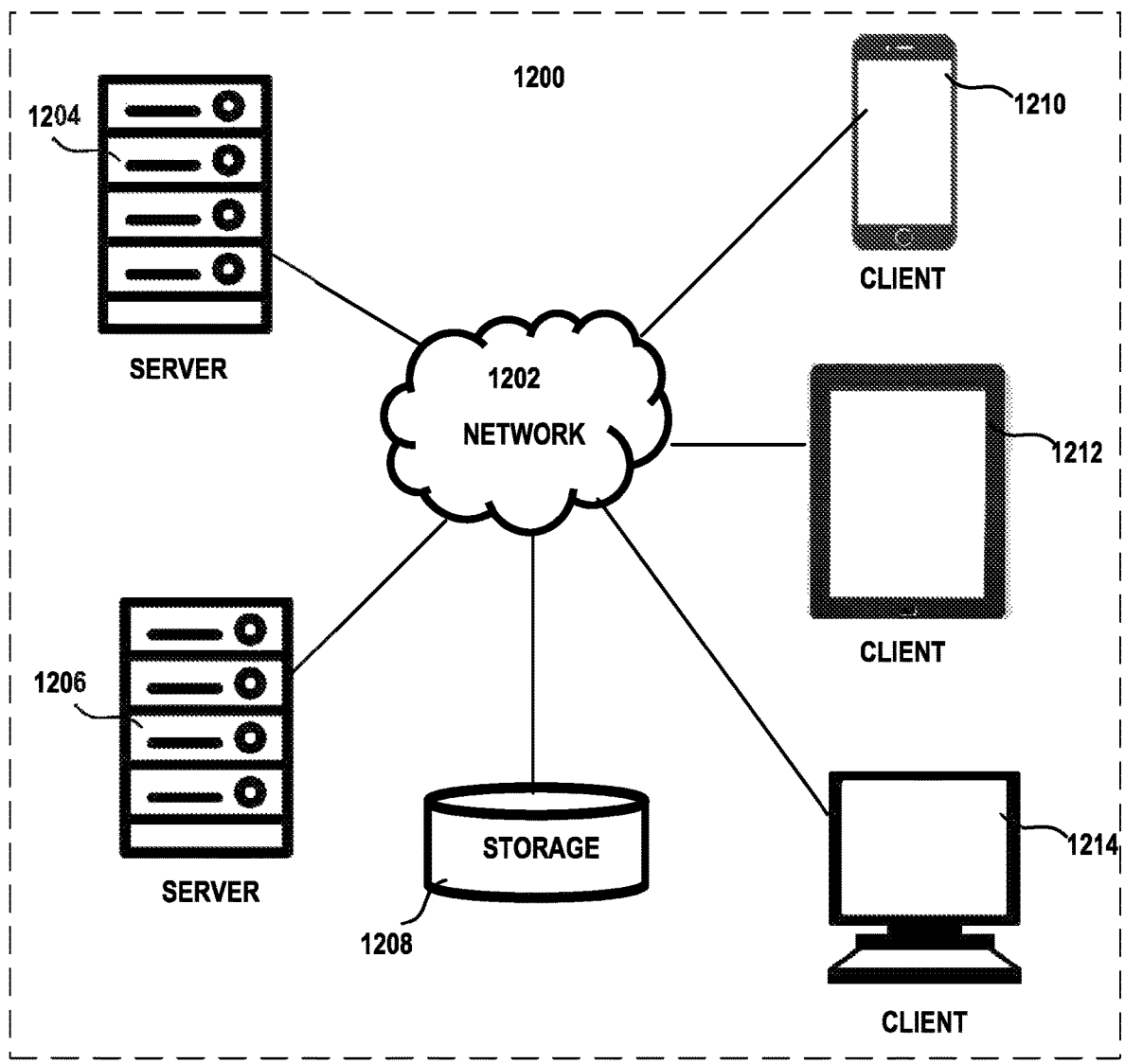
FIG. 12 depicts an exemplary block diagram of a distributed data processing environment in which exemplary aspects of the illustrative embodiments may be implemented.
Figure 13:
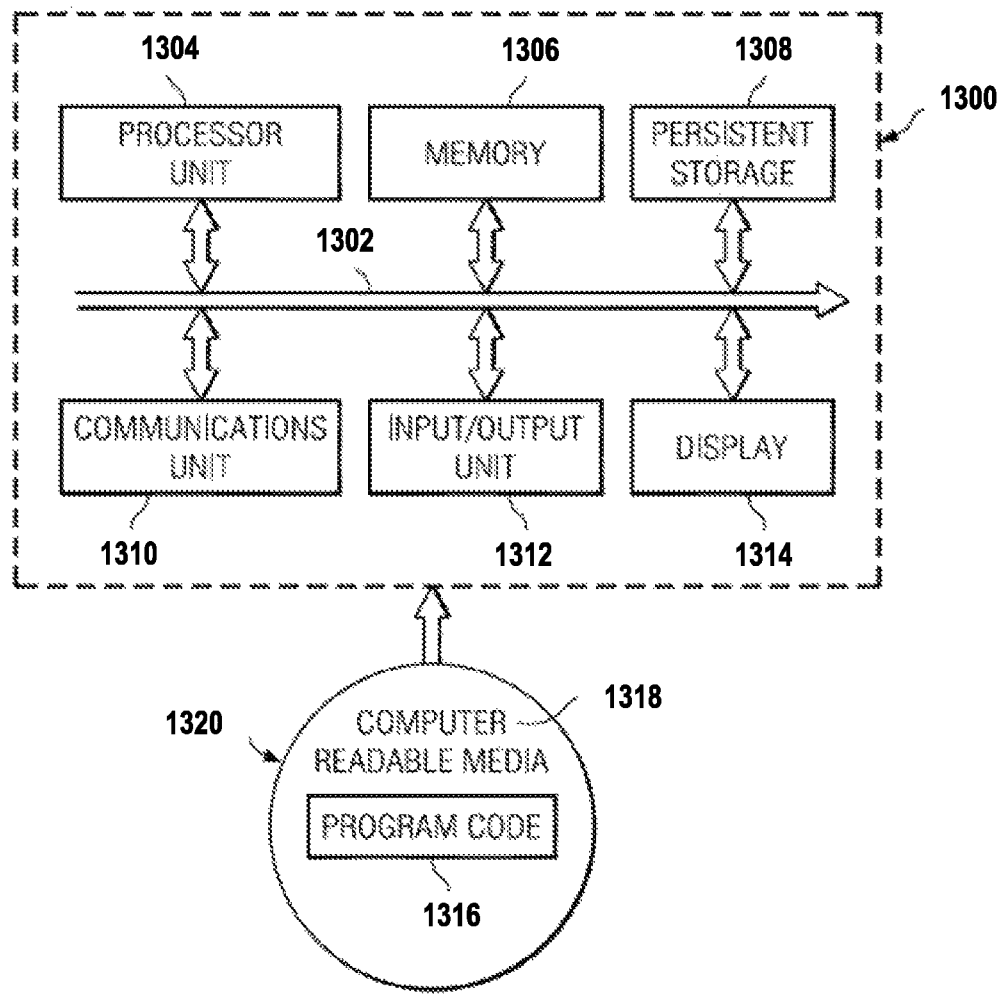
FIG. 13 is an exemplary block diagram of a data processing system in which exemplary aspects of the illustrative embodiments may be implemented.

With reference now to the drawings and in particular with reference to FIGS. 12-13, exemplary diagrams of data processing environments are provided in which illustrative embodiments of the disclosure may be implemented. It should be appreciated that FIGS. 12-13 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 12 depicts a pictorial representation of an exemplary distributed data processing system in which aspects of the illustrative embodiments may be implemented. Distributed data processing system 1200 may include a network of computers in which aspects of the illustrative embodiments may be implemented. The distributed data processing system 1200 contains at least one network 1202, which is the medium used to provide communication links between various devices and computers connected together within distributed data processing system 1200. The network 1202 may include connections, such as wire, wireless communication links, or fiber optic cables.

In the depicted example, server 1204 and server 1206 are connected to network 1202 along with network storage unit 1208. In addition, clients 1210, 1212, and 1214 are also connected to network 1202. These clients 1210, 1212, and 1214 may be, for example, smartphones, tablet computers, personal computers, network computers, or the like. In the depicted example, server 1204 provides data, such as boot files, operating system images, and applications to the clients 1210, 1212, and 1214. Clients 1210, 1212, and 1214 are clients to server 1204 in the depicted example. Distributed data processing system 1200 may include additional servers, clients, and other devices not shown. One or more of the server computers may be a mainframe computer connected to network 1202. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 1200 is the Internet with network 1202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 12 is intended as an example, not as an architectural limitation for different embodiments of the disclosed subject matter, and therefore, the particular elements shown in FIG. 12 should not be considered limiting with regard to the environments in which the illustrative embodiments of the present invention may be implemented.

With reference now to FIG. 13, a block diagram of an exemplary data processing system is shown in which aspects of the illustrative embodiments may be implemented. Data processing system 200 is an example of a computer, such as client 1214 in FIG. 12, in which computer usable code or instructions implementing the processes for illustrative embodiments of the disclosure may be located.

With reference now to FIG. 13, a block diagram of a data processing system is shown in which illustrative embodiments may be implemented. Data processing system 1300 is an example of a computer, such as server 1204 or client 1210 in FIG. 12, in which computer-usable program code or instructions implementing the processes may be located for the illustrative embodiments. In this illustrative example, data processing system 1300 includes communications fabric 1302, which provides communications between processor unit 1304, memory 1306, persistent storage 1308, communications unit 1310, input/output (I/O) unit(s) 1312, and display 1314.

Processor unit 1304 serves to execute instructions for software that may be loaded into memory 1306. Processor unit 1304 may be a set of one or more processors or may be a multi-processor core, depending on the particular implementation. Further, processor unit 1304 may be implemented using one or more heterogeneous processor systems in which a main processor is present with secondary processors on a single chip. As another illustrative example, processor unit 1304 may be a symmetric multi-processor (SMP) system containing multiple processors of the same type.

Memory 1306 and persistent storage 1308 are examples of storage devices. A storage device is any piece of hardware that is capable of storing information either on a temporary basis and/or a permanent basis. Memory 1306, in these examples, may be, for example, a random access memory or any other suitable volatile or non-volatile storage device. Persistent storage 1308 may take various forms depending on the particular implementation. For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these examples, provides for communications with other data processing systems or devices. In these examples, communications unit 1310 is a network interface card. Communications unit 1310 may provide communications through the use of either or both physical and wireless communications links.

Input/output unit 1312 allows for input and output of data with other devices that may be connected to data processing system 1300. For example, input/output unit 1312 may provide a connection for user input through a keyboard and mouse. Further, input/output unit 1312 may send output to a printer. Further, input/output unit may provide connections to a microphone for audio input from a user and a speaker to provide audio output from the computer. Display 1314 provides a mechanism to display information to a user.

Instructions for the operating system and applications or programs are located on persistent storage 1308. These instructions may be loaded into memory 1306 for execution by processor unit 1304. The processes of the different embodiments may be performed by processor unit 1304 using computer implemented instructions, which may be located in a memory, such as memory 1306. These instructions are referred to as program code, computer-usable program code, or computer-readable program code that may be read and executed by a processor in processor unit 1304. The program code in the different embodiments may be embodied on different physical or tangible computer-readable media, such as memory 1306 or persistent storage 1308.

Program code 1316 is located in a functional form on computer-readable media 1318 that is selectively removable and may be loaded onto or transferred to data processing system 1300 for execution by processor unit 1304. Program code 1316 and computer-readable media 1318 form computer program product 1320 in these examples. In one example, computer-readable media 1318 may be in a tangible form, such as, for example, an optical or magnetic disc that is inserted or placed into a drive or other device that is part of persistent storage 1308 for transfer onto a storage device, such as a hard drive that is part of persistent storage 1308. In a tangible form, computer-readable media 1318 also may take the form of a persistent storage, such as a hard drive, a thumb drive, or a flash memory that is connected to data processing system 1300. The tangible form of computer-readable media 1318 is also referred to as computer-recordable storage media. In some instances, computer-recordable media 1318 may not be removable.

Alternatively, program code 1316 may be transferred to data processing system 1300 from computer-readable media 1318 through a communications link to communications unit 1310 and/or through a connection to input/output unit 1312. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 13 can be varied from the illustrative examples shown. As one example, a storage device in data processing system 1300 is any hardware apparatus that may store data. Memory 1306, persistent storage 1308, and computer-readable media 1318 are examples of storage devices in a tangible form.

In another example, a bus system may be used to implement communications fabric 1302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1306 or a cache such as found in an interface and memory controller hub that may be present in communications fabric 1302.

Computer program code for carrying out operations of the present invention may be written in any combination of one or more programming languages, including an object-oriented programming language such as Java™, Smalltalk, C++, C #, Objective-C, or the like, and conventional procedural programming languages such as Python or C. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 12-13 may vary depending on the implementation. Other internal hardware or peripheral devices, such as flash memory, equivalent non-volatile memory, or optical disk drives and the like, may be used in addition to or in place of the hardware depicted in FIGS. 12-13. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 12 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 13 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

Cloud Environment—

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 13 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 14:
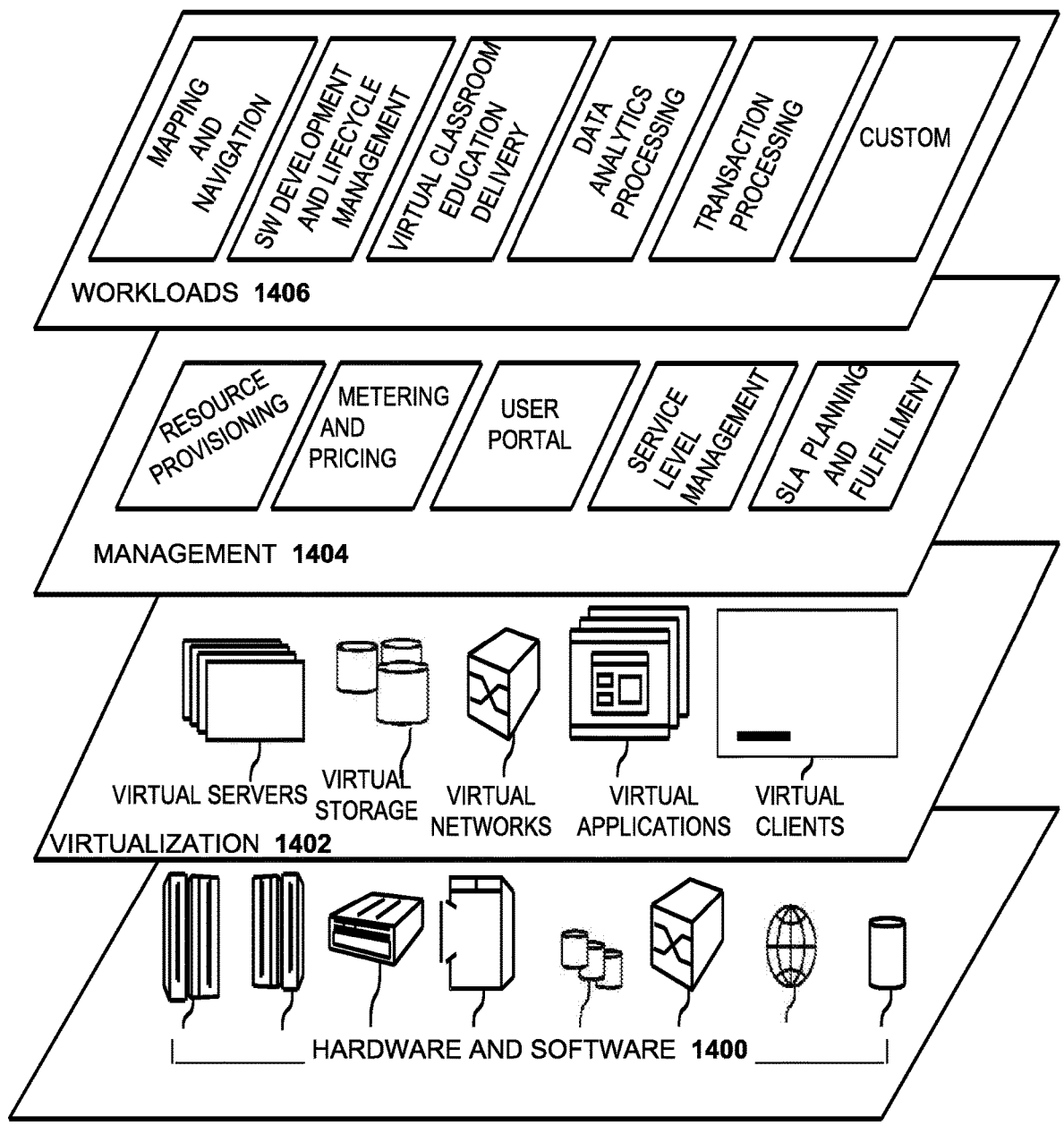
FIG. 14 illustrates an exemplary cloud computing architecture in which the disclosed subject matter may be implemented.

Referring now to FIG. 14, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 1400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 1402 provides an abstraction layer from which the following examples of virtual entities may be provided: virtual servers; virtual storage; virtual networks, including virtual private networks; virtual applications and operating systems; and virtual clients.

In one example, management layer 1404 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 1406 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Hybrid cloud environments drive the need for secure communication between applications between different hosting environments. As the number of applications and platforms grows, the number of secure communication paths grows rapidly. Prior art dedicated VPNs create large communication channels in environments that need to be secured. Many transmission needs are highly-granular requirements, such as event management, wherein log data is sent from many devices to a central server; traditional VPN use wide communication channels which are unneeded and pose security risks. Other examples of applications which transmit small amounts of data between clouds include applications trying to sync data on a periodic basis, e.g., once in a month, or monitoring applications which send regular but small amounts of data.

Prior art software VPNs can partially solve this problem by creating communication paths for particular applications or particular clouds, however, application-based solutions generally apply only to a single application, can be hard to manage, can be hard to monitor, and do not take advantage of efficiency of scale.

The present invention includes embodiments that dynamically deploy and reconfigure highly-tuned VPNs based on application requirements from multiple applications and provide optimal topologies for the hybrid cloud environments.

The order of steps in which the method is described is not intended to be construed as a limitation, and any number of the described method blocks may be combined in any order to implement the method, or an alternate method. Additionally, individual blocks may be deleted from the method without departing from the spirit and scope of the embodiments of the invention.

One skilled in the art will understand that the division of tasks between the modules is exemplary, and that other embodiments of the invention will divide the tasks differently. Further, in describing exemplary processes below, the order in which the processes are described with reference to the flow diagrams is not intended to be construed as a limitation, and any number of the described method blocks may be combined in a different order to implement the method, or alternate method. Additionally, individual blocks may be deleted from the method without departing from the spirit and scope of the subject matter described herein.

The present invention has many advantages over the prior art. Embodiments of the invention combine input from a plurality of different event sources to provide a user an intuitive graphical user interface for displaying and summarizing security threat severity in a distributed computing environment. In embodiments, the event sources are preferably a plurality of different types of event sources. In preferred embodiments, a three dimensional object such as a "threat well" and/or a "displayed mass" is used to portray the severity of the network threat in a "three-dimensional" (3D) user interface.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method for managing security threats to a distributed network comprising:
    aggregating events from a plurality of event sources in the network for each of a set of security threats to the network;
    determining a magnitude of a characteristic of each of the set of security threats;
    representing ones of the set of security threats having a magnitude of the characteristic greater than a threshold as a three dimensional graphical object in a three dimensional (3D) representation of the network according to the respective magnitude of the characteristic; and
    facilitating a security action based on the determined magnitude of one of the set of security threats.

2. The method as recited in claim 1, wherein the 3D dimensional graphical object of each of the set of security threats is a threat well, the characteristic is a severity of the security threat and a relative severity of the security threat is depicted as a displacement of the threat well from a planar interface object representing a network.

3. The method as recited in claim 1, wherein a respective threat well can be selected to list a set of events of the distributed network associated with the security threat represented by the threat well.

4. The method as recited in claim 1, wherein respective dimensions of the threat wells dynamically expand and contract to reflect a respective current severity of the set of security threats based on new events and decay freshness of old events aggregated to the security threat.

5. The method as recited in claim 1, wherein the 3D dimensional graphical object of each of the set of security threats is a threat well and displayed mass pair, wherein a dimension of the threat well represents a first characteristic of the security threat and a dimension of the displayed mass represents a second characteristic of the security threat.

6. The method as recited in claim 4, wherein a first decay factor for a 3D dimensional graphical object of a security threat that has been remediated by a user is different than a second decay factor for a 3D dimensional representation of a security threat that has been not been remediated by a user.

7. The method as recited in claim 4, wherein a decay process for a 3D dimensional graphical object of a security threat begins according to a creation time of the for a 3D dimensional graphical object of a security threat and the decay process is reset responsive to a new event received after the creation time being assigned to the security threat.

8. The method as recited in claim 1, wherein a 3D dimensional representation for a security threat is a cluster of a plurality of 3D dimensional representations, a dimension of each of the plurality of 3D dimensional representations is representative of a magnitude of a respective characteristic of the respective security threats and the security threats have similar sets of high value events.

9. Apparatus, comprising:
a processor;
computer memory holding computer program instructions executed by the processor for managing security threats to a distributed network, the computer program instructions comprising:
program code, operative to aggregate events from a plurality of event sources in the network for each of a set of security threats to the network;
program code, operative to determine a magnitude of a characteristic of each of the set of security threats;
program code, operative to represent ones of the set of security threats having a magnitude of the characteristic greater than a threshold as a three dimensional graphical object in a three dimensional (3D) representation of the network according to the respective magnitude of the characteristic; and
program code, operative to facilitating a security action based on the determined magnitude of one of the set of security threats.

10. The apparatus as recited in claim 9, further comprising:
event adapter code, operative to receive events from a type of event source wherein the event adapter code normalizes events received from the event source to a format for the aggregating code.

11. The apparatus as recited in claim 10, wherein the event sources comprise a plurality of different security applications which monitor different security aspects of the network and the event adapter code comprises a different adapter for each type of security application.

12. The apparatus as recited in claim 10, wherein the event adapter code determines whether a respective event is a high value event and only forwards high value events to the aggregating code, wherein only high value events are used for creating a threat well.

13. The apparatus as recited in claim 10, wherein the event adapter code determines a severity of an event based on an event payload.

14. The apparatus as recited in claim 9, wherein the characteristic is a severity of the security threat and the severity is established by the aggregating code based on an event count associated with the security threat, a credibility of security threat information, a relevance of events to the security threat directed at a set of aggregated assets, and an importance of the set of assets to an organization.

15. A computer program product in one or more computer readable storage media, and program instructions collectively stored on the one or more computer readable storage media, the computer program product holding computer program instructions executed by the data processing system for managing security threats to a distributed network, the computer program instructions comprising:
program code, operative to aggregate events from a plurality of event sources in the network for each of a set of security threats to the network;
program code, operative to determine a magnitude of a characteristic of each of the set of security threats;
program code, operative to represent ones of the set of security threats having a magnitude of the characteristic greater than a threshold as a three dimensional graphical object in a three dimensional (3D) representation of the network according to the respective magnitude of the characteristic; and
program code, operative to facilitating a security action based on the determined magnitude of one of the set of security threats.

16. The computer program product as recited in claim 15, wherein a 3D dimensional representation for a security threat has a set of dimensions and each of the set of dimensions is representative of a magnitude of a respective characteristic of the security threat.

17. The computer program product as recited in claim 15, wherein a 3D dimensional representation for a security threat has a set of features and a color of one of the set of representative is representative of a magnitude of a respective characteristic of the security threat.

18. The computer program product as recited in claim 16, wherein a set of three dimensional graphical objects in a three dimensional (3D) representation of the network are clustered according to a similarity of security threats represented by the 3D graphical objects based on a similarity of events associated with respective 3D graphical objects.

19. The computer program product as recited in claim 15, further comprising:
program code, operative to determine a creation time of a first three dimensional graphical object representing a first security threat;
program code, operative to determine whether a remediation action has been taken to remediate the first security threat;
program code, operative to establish a decay factor for the first three dimensional graphical object based on whether the remediation action has been taken for the first security threat; and
program code, operative to portray the three dimensional graphical object based on the established decay factor.

20. The computer program product as recited in claim 19, further comprising:
    program code, operative to determine that a new event has been aggregated to the security threat after the creation time of the first three dimensional graphical object; and
    program code, operative to reset the portrayal of the three dimensional graphical object based on the new event.

* * * * *